(12) United States Patent
Davids

(10) Patent No.: US 11,540,485 B2
(45) Date of Patent: Jan. 3, 2023

(54) COMPRESSED COCONUT COIR PITH TABLETS AND METHOD AND APPARATUS FOR THE PRODUCTION AND USE THEREOF

(71) Applicant: GALUKU GROUP LIMITED, Tsim Sha Tsui (HK)

(72) Inventor: Joe Davids, Vauclause (AU)

(73) Assignee: GALUKU GROUP LIMITED, Tsim Sha Tsui (HK)

(*) Notice: Subject to any disclaimer, the term of this patent is extended or adjusted under 35 U.S.C. 154(b) by 1070 days.

(21) Appl. No.: 15/857,820

(22) Filed: Dec. 29, 2017

(65) Prior Publication Data
US 2019/0200568 A1 Jul. 4, 2019

(51) Int. Cl.
*A01K 1/015* (2006.01)
*B01J 20/30* (2006.01)

(52) U.S. Cl.
CPC ......... *A01K 1/0155* (2013.01); *B01J 20/3035* (2013.01); *B01J 2220/4825* (2013.01); *B01J 2220/50* (2013.01)

(58) Field of Classification Search
CPC ................ A01K 1/0155; B01J 20/3035; B01J 2220/4825; B01J 2220/50
See application file for complete search history.

(56) References Cited

U.S. PATENT DOCUMENTS

| | | | |
|---|---|---|---|
| 2004/0025422 A1* | 2/2004 | MacQuoid | A01G 24/13 47/9 |
| 2018/0014459 A1* | 1/2018 | Roberts | B01D 15/08 |

FOREIGN PATENT DOCUMENTS

| | | |
|---|---|---|
| CN | 203765879 U | 8/2014 |
| CN | 104351062 A | 2/2015 |
| CN | 105459434 A | 4/2016 |
| CN | 106113557 A | 11/2016 |
| CN | 107415310 A | 12/2017 |
| ES | 2007581 A4 | 7/1989 |

OTHER PUBLICATIONS

Search Report and Written Opinion dated May 29, 2019 in International Application No. PCT/IB2018/060516.

* cited by examiner

*Primary Examiner* — Andrew J. Oyer
(74) *Attorney, Agent, or Firm* — Miles & Stockbridge P.C.; David R. Schaffer

(57) ABSTRACT

Embodiments of the disclosed subject matter include a litter scoop that will work with a pelleted cat litters made from various substances such as wood shavings, bamboo, paper, coir, etc.

16 Claims, 27 Drawing Sheets

COMPRESSED COCONUT COIR PITH TABLETS AND METHOD AND APPARATUS FOR THE PRODUCTION AND USE THEREOF

TECHNICAL AREA

The presently disclosed subject matter relates generally to compressed, absorbent tablets, and more particularly to compressed coconut coir pith tablets and a method and apparatus for the production thereof. The tablets being usable to absorb liquids and can be used as a pet litter.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

In the following drawings, like reference numerals generally indicate identical, functionally similar, and/or structurally similar elements. The left most digits in the corresponding reference numeral indicate the drawing in which an element first appears.

DETAILED DESCRIPTION

Figure 1:
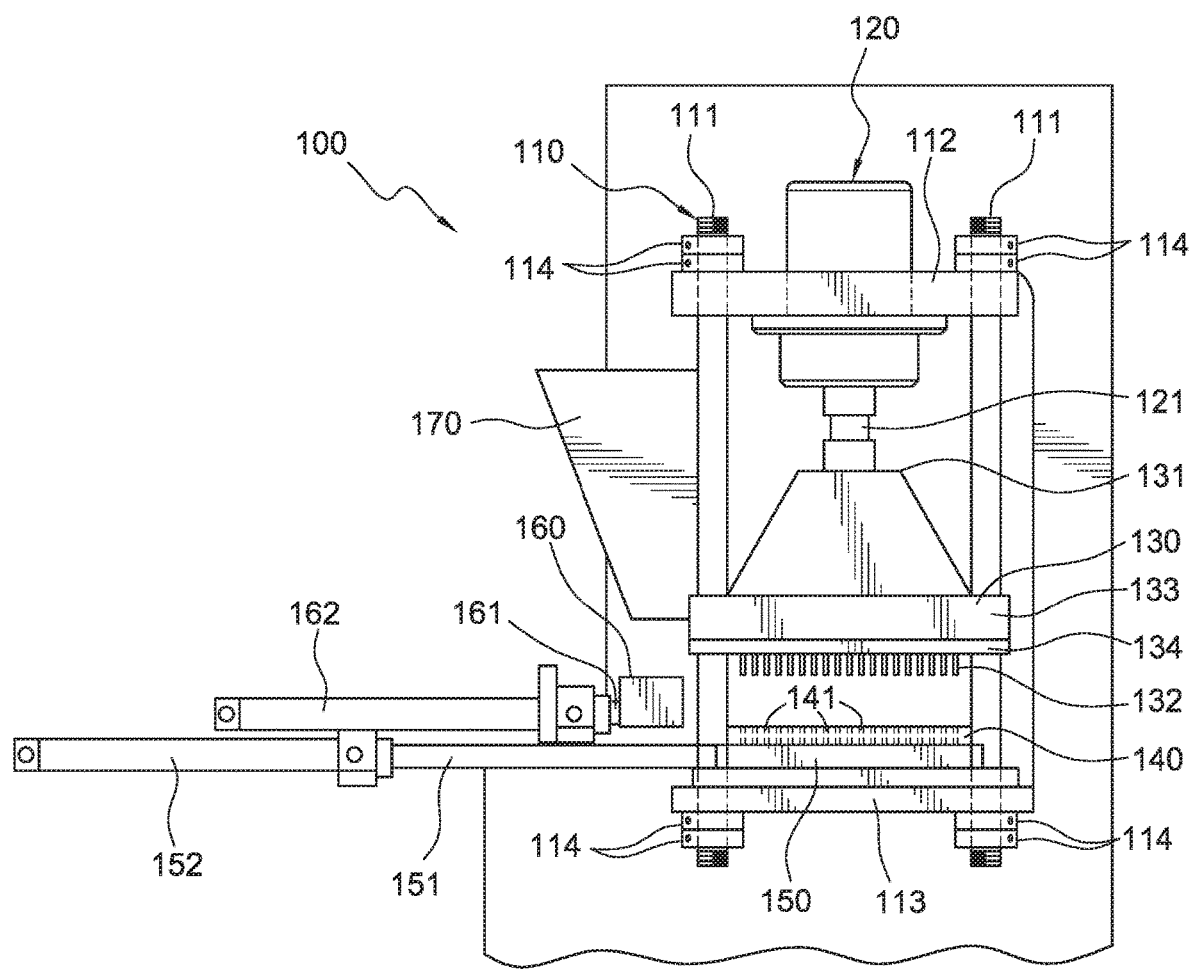
FIG. 1 depicts a right side view of an apparatus for the production of coir pith tablets with dual hydraulic cylinders in a home position, in accordance with an exemplary embodiment of the disclosed subject matter.

In general, one or more embodiments of the disclosed subject matter can include (i.e., comprise) a tablet press including a frame, the frame including a top plate with four openings formed there through adjacent to four corners of the top plate, a bottom plate with four openings formed there through adjacent to four corners of the bottom plate, four vertical guide rods with each vertical guide rod passing through opposite openings in the top plate and the bottom plate and being connected at opposite ends of each guide rod to the top plate and the tablet press and a hydraulic cylinder with a moveable internal piston connected to and through the top plate. The tablet press can also include a hydraulic pump system including a motor connected to a plurality of hydraulic lines, with at least one hydraulic line being operationally connected to the hydraulic cylinder and a moveable punch with a top portion, a punch main plate backer and a punch main plate with a plurality of pins extending from a bottom surface, where a distal end of the moveable internal piston is connected to the top portion of the moveable punch. The tablet press can further include a fixed die positioned above and attached to the bottom plate, with the fixed die including a plurality of openings formed therethrough with a top of each opening formed in a top surface of the fixed die and a bottom of each opening formed in a bottom surface of the fixed die and a moveable door being positioned outside of the frame and also beneath the fixed die and between the fixed die and the bottom plate to close the bottom of each opening in the fixed die and to push out any previously formed tablets and excess coir pith, the moveable door being connected to a moveable door piston and a moveable door hydraulic cylinder, which is operationally connected to the hydraulic pump system. The tablet press can still further include a moving hopper connected to a moving hopper piston and a moving hopper hydraulic cylinder, which is operationally connected to the hydraulic pump system, the moving hopper being positioned outside of the frame and immediately above the top surface of the fixed die and being moveable into the frame and across the fixed die and back to a position outside of the frame; and a control unit operationally connected to the hydraulic pump system and motor to control operation and performance of the tablet press.

Embodiments of the disclosed subject matter include forming a pellet or tablet (pill) with coir pith (coconut husk dust) to enhance the liquid absorbent abilities of the coir pith for use as a spill absorbent, cat litter, animal bedding or as a carrier device for deploying fertilizers, insecticides or chemical/biological agents. In general, the tablets are made from at least 80% coir pith by volume and can include additives such as odour eating enzymes, insecticides, fertilizers, clumping agents and the like.

Coconut Husk coir is a natural by-product of the coconut industries in South East Asia. The husk of the coconut is comprised of long strands of fibers, and small dust-like particles, the coir pith, which holds the fibers together. The long strands of fibers are used for a variety of purposes such as making ropes and mattresses, etc. The coir pith will separate from the fiber strands when placed in a hammermill style of device. Coir is the small dust-like particles that fall away when the long fibers are separated.

It is well known that coconut husk coir has the ability to absorb up to ten times its own weight in liquid due to its microscopic sponge-like structure that provides it with an enormous surface area. It is also well known that coconut husk coir can be compressed up to nine to one in volume, and the compressed coir will not be structurally damaged at a microscopic level, thus retaining it's 'original state' memory. For instance 10 liters of coir can be compressed to fit into the physical space of 1liter. The "original state" or memory, allows the coir to re-expand back to its original volume again if water is added to the compressed coir. The benefits of being able to compress and un-compress coir are numerous, for example, it allows for greater volumes of material to be shipped around the world in less space, but will un-compress to its original volumetric level at the point of application. Coir is the only natural substance known to have these properties.

In most applications coconut husk coir is used either in a bulked out (loose) form of the product for potting soils and growing media. In these applications coir can be shipped in compressed briquettes, blocks or bales, hugely decreasing the cost of transportation, and by adding water to these briquettes, blocks or bales at the application site, it will re-expand into the uncompressed state making it bulked out into loose form. Compressed coir in various shapes can also be placed inside plastic sleeves or covers so it can be shipped in compressed form, and again by the addition of water it can be un-compressed inside the plastic sleeve creating a grow bag/container for hydroponic crop production in greenhouses.

To compress coir into a certain shape like a briquette or block or plank or disc, can be done by creating a mould for the shape required, and using hydraulic pressure to compress the coir down to the required shape and size. This can be done using compression ratios of 2 to 1, 3 to 1, 4 to 1 and up to 9 to 1. Compression beyond 9 to 1 is not recommended as it is believed that doing so will destroy the molecular structure of the coir. It is, however, very critical to understand that compressed coir above 3 to 1 compression, will not re-expand to its un-compressed volume if the compression is done while the coir has a moisture content above a certain level. If the moisture content is above this critical level than re-expansion to uncompressed volume size will be inhibited and in most cases re-expansion will not happen.

Compressed coir can also be used to disperse larger volumes of coir across a large area to spread fertilizers, seeds and biological agents for the prevention of pests and insects. However the compressed coir will need to be in a much smaller format than what has been available to-date.

Coir is also used in its loose, un-compressed form in industrial applications as a spill absorbent or litter for animals. In its loose uncompressed form coir is lightweight and can be blown around or create dust. If used as a litter for animals, this loose form coir can be tracked around the animal enclosure or all over the floor in the house, if used as a cat litter. The lightweight of the coir also means it is easily kicked or scratched out of the litter box of the animal or sticks to the animal's hair or fur to be carried around the house. To overcome these deficiencies, in embodiments of the disclosed subject matter, the coir is prepared in a compressed format.

To-date, the only methods or inventions described or proposed pertaining to making compressed coir in a relatively small form, so it can be used as a heavier spill absorbent and that does not get blown away, or as an animal litter that does not get thrown or carried out of the litter box, or in a compressed medium for the use as a large area dispersant vehicle to apply fertilizers, seeds, biological agents etc., is to pelletize the coir in extrusion-type pellet mills. No such pelletized coir products are believed to have ever reached the market.

The problem with 'pelletizing' coir whether it be 100% coir, or coir blended with other materials, is that pelletizing mills require the input materials to have a degree of moisture so that it can be pushed into the extrusion pipe of the pellet mill. Pellet mills also tend to grind the input material into a much finer particle size in the milling part of the pelletizing process. Current methods use a drying process for the resulting moist pellets such as oven drying, freeze-drying or air-drying. Some methods 1 add binding agents such as clay, etc. to the coir to facilitate pelletizing of the coir, or for creating the applications for these pellets, such as cat litter etc. There is an inherent and obvious problem in making pelletized coir in pellet mills, as this process requires the addition of water either directly, or as steam, or alternatively moist additives can be used to facilitate the addition of moisture for the extrusion of pellets. Once these pellets are dried out using any of the drying methods described, one will find that after a short period of time that these pellets become hydrophobic, meaning they will not absorb any liquid. The milling process also makes the particle sizes of the coir much smaller inhibiting its re-expansion properties. This combination of the addition of moisture and the smaller particle sizes being milled and extruded into pellets, and then dried creates a pellet that will not re-absorb water within a short period of time after being produced. Here we are talking about a shelf life of no more than two weeks.

In embodiments of the disclosed subject matter, coconut husk coir is formed into a small compressed format, for example, a tablet having a diameter of about 7.5 mm and a thickness of about 3 mm that will re-expand into its un-compressed state when it contacts liquids ranging from water to hydrocarbons. In other words, its un-compressed volume. In general, when liquid contacts the coir pith tablets, they immediately begin to absorb the liquid. This is different than traditional clay-type litters where liquids mainly pass through to the bottom of the pan in which the clay-type litters are placed, and then is absorbed up into the clay-type litter. As a result, the clumps formed by this process are usually on the bottom of the litter. In contrast, because the coir pith tablets absorb the liquid immediately, used litter remains on the top. The small, compressed coir tablet should not become hydrophobic and unable to absorb liquids within a short space of time. The shelf life of the format should be more than 12 months. Current, ongoing testing has shown that tablets made in accordance with the disclosed subject matter have shelf lives of over 18 months.

In embodiments of the disclosed subject matter, the coir pith tablets are compressed in a dry state and no water or moisture is added during compression via other additives. Coir pith of particle sizes between 2 mm to 4 mm with fibers removed are used to make the tablets and the moisture content of the coir pith is below 15% or 60 g-70 g water/L of uncompressed coir pith. The tablet size is approximately 7.5 mm diameter×3 mm thick.

In embodiments of the disclosed subject matter, the apparatus to make the coir pith tablets that will re-expand and un-compress includes a fixed die made from a steel plate with 520 holes formed through the fixed die with each having a diameter of 7.5 mm and a depth of 15 mm. The apparatus also includes a heavy steel floor plate or moving door positioned underneath the fixed die to act as the floor of the holes. The moving door is able to move in an out to close and open the holes at a bottom of the fixed die to enable compression when closed and to release the compressed tablets after compression.

FIG. 1 depicts a right side view of an apparatus for the production of coir pith tablets with dual rams in a HOME position, in accordance with an exemplary embodiment of the disclosed subject matter. In the embodiment in FIGS. 1 and 2, the apparatus, a tablet press 100, is a hydraulically driven system that includes a frame 110 made of four vertical guide rods 111, a top plate 112, a bottom plate 113 and multiple nuts 114. Top ends of the guide rods 111 are threaded and extend through openings in the top plate 112 and are fastened to the top plate 112 with 2 nuts 114 each, which act to lock the nuts 114 in place. Two main hydraulic cylinders 120 (best seen in FIG. 2) are affixed through and to the top plate 112 and each main hydraulic cylinder 120 includes a main hydraulic cylinder piston 121 extending vertically out of a bottom of the main hydraulic cylinder 120. The main hydraulic cylinder piston 121 is configured to move vertically up and down and toward and away from the bottom plate 113. A bottom end of the main hydraulic cylinder piston 121 is connected to a top portion 131 of a moveable punch 130 that has 520 pins 132 extending from a bottom surface. The top portion 131 has a trapezoidal shape which help ensure even pressure is applied to the moveable punch 130 and the pins 132. A Jac cylinder 180 has a Jac cylinder piston 181 and is located between the two main hydraulic cylinders 120 and is similarly affixed through and to the top plate 112. The Jac cylinder 180 is connected to and controlled by the two main hydraulic cylinders 120 and the Jac cylinder piston 181 is connected to a middle of the moveable punch 130. The Jac cylinder 180 functions to assist in speeding up the movement of the top plate 112 to decrease the punch cycle time.

Figure 2:
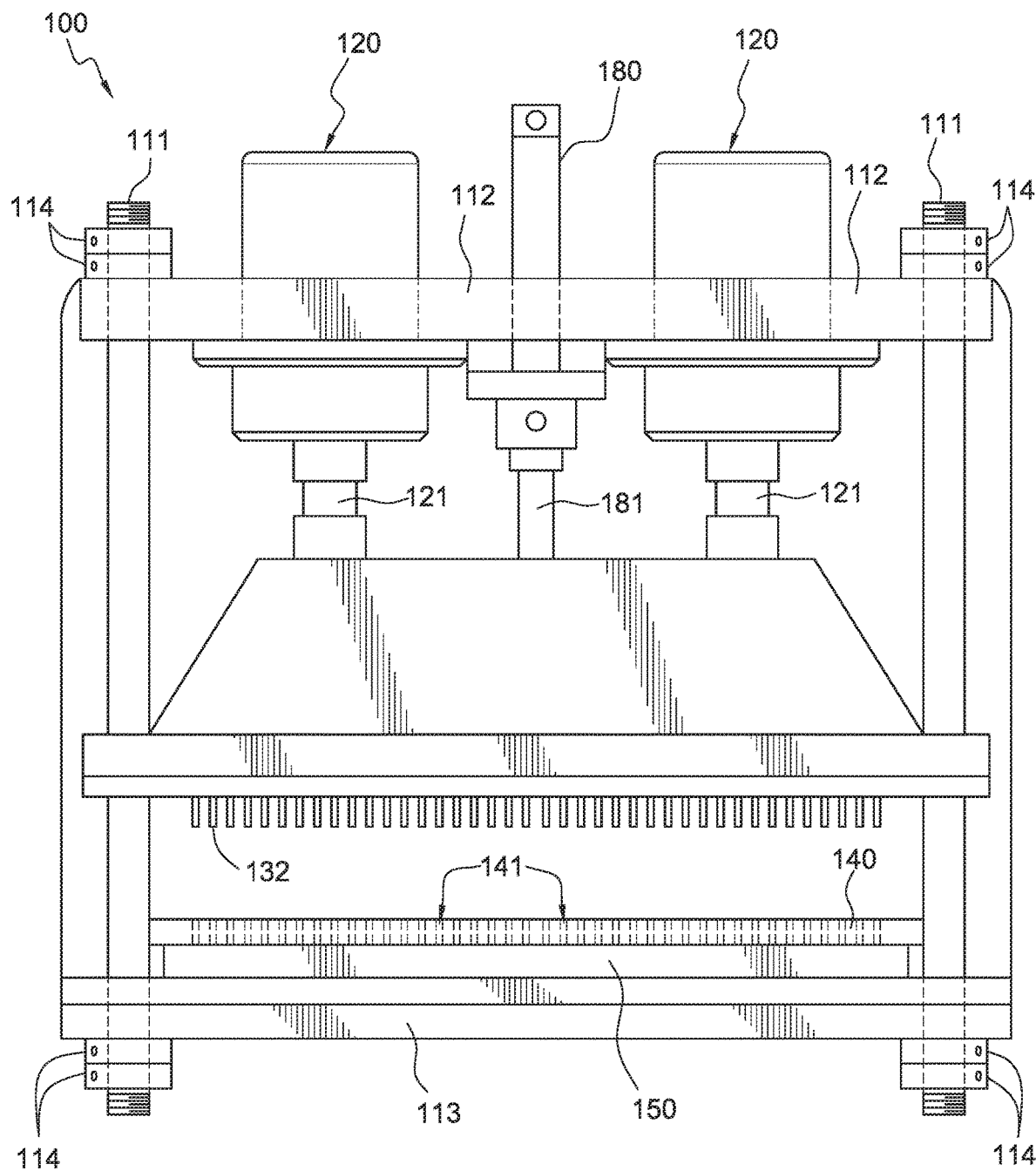
FIG. 2 depicts a front view of the apparatus for the production of coir pith tablets of FIG. 1, in accordance with an exemplary embodiment of the disclosed subject matter.

In FIGS. 1 and 2, the moveable punch 130 has a punch main plate backer 133 above a punch main plate 134 and each has four holes formed through it adjacent the four corners of the punch main plate backer 133 and the punch main plate 134 and through which the vertical guide rods 111 extend and along which the punch main plate backer 133 and the punch main plate 134 are able to move vertically. Adjacent to and above the bottom plate 113 is affixed a fixed die 140 through which are formed 520 openings 141 that are sized and configured to receive the 520 pins 132 on the moveable punch 130. Immediately below the fixed die 140 is a moveable door 150, which is connected to a hydraulic door cylinder 152 via a hydraulic door piston 151. The moveable door 150 can be moved from immediately beneath the fixed die 140 to cover/close the bottom open ends of each of the openings 141 to outside the tablet press 100 to open the bottom open ends of each of the openings 141. As seen in FIGS. 1 and 2, the moveable door 150 is immediately beneath the fixed die 140 to cover/close the bottom open ends of each of the openings 141, a moving hopper 160 can move from outside the frame 110 and move over and across the fixed die 140. The moving hopper 160 is connected by a hydraulic moving hopper piston 161 to and moved by a hydraulic moving hopper cylinder 162. If the moving hopper 160 is filled with coir pith, it can fill each of the openings 141 with the coir pith as it passes over each of the openings 141. A fixed hopper 170 is attached to an outside of the frame 110 and is located immediately above the moving hopper 160 when the moving hopper 160 is moved to be outside of the frame. The fixed hopper 170 can include an openable bottom to refill the moving hopper 160 after it has moved across the fixed die 140 and filled all of the 520 openings 141. The fixed hopper 170 has an open top through which coir pith is filled. The fixed hopper 170 can be operated manually or automatically when the moving hopper 160 returns to be outside of the frame.

In the embodiment of the disclosed subject matter in FIGS. 1 and 2, each of the main hydraulic cylinder 120 pistons 121 can have a diameter of about 250 mm, the hydraulic door piston 151 can have a diameter of about 50 mm and the hydraulic moving hopper piston 161 can have a diameter of 50 mm. Also, the guide rods 111 can have a diameter of 50 mm and the Jac cylinder 180 can have a Jac cylinder piston 181 with a diameter of 63 mm. Each pin 132 has a diameter of 7.5 mm and is made of oil hardening non shrinking steel (OHNS), and each opening 141 has a diameter of 7.5 mm and the length of each opening 141 is 15 mm. The punch main plate 134 and the moving door 160 each has a thickness of 50 mm. A motor, for example, a five (5) horsepower (hp) motor (not shown), is used to run the tablet press 100 and power a hydraulic pump system (not shown) to compress the coir pith in the holes down with the pins 132 from 15 mm to 3 mm using about a 110 ton load. This is equivalent to 115 Bar Pressure or about 1, 668 psi and is applied for about 15 seconds or more.

FIGS. 1-16 are sequential and show the coir pith tablet making process of the presently disclosed subject matter. In FIG. 1, the system is in position to begin the process of producing coir pith tablets. Specifically, the dual cylinders 120 are in the up HOME position, the moveable door 150 is in position underneath the fixed die 140 to close the bottoms of the holes 141, and the moving hopper 160 is in position to be filled with coir pith.

FIG. 2 depicts a front view of the apparatus for the production of coir pith tablets of FIG. 1, in accordance with an exemplary embodiment of the disclosed subject matter.

Figure 3:
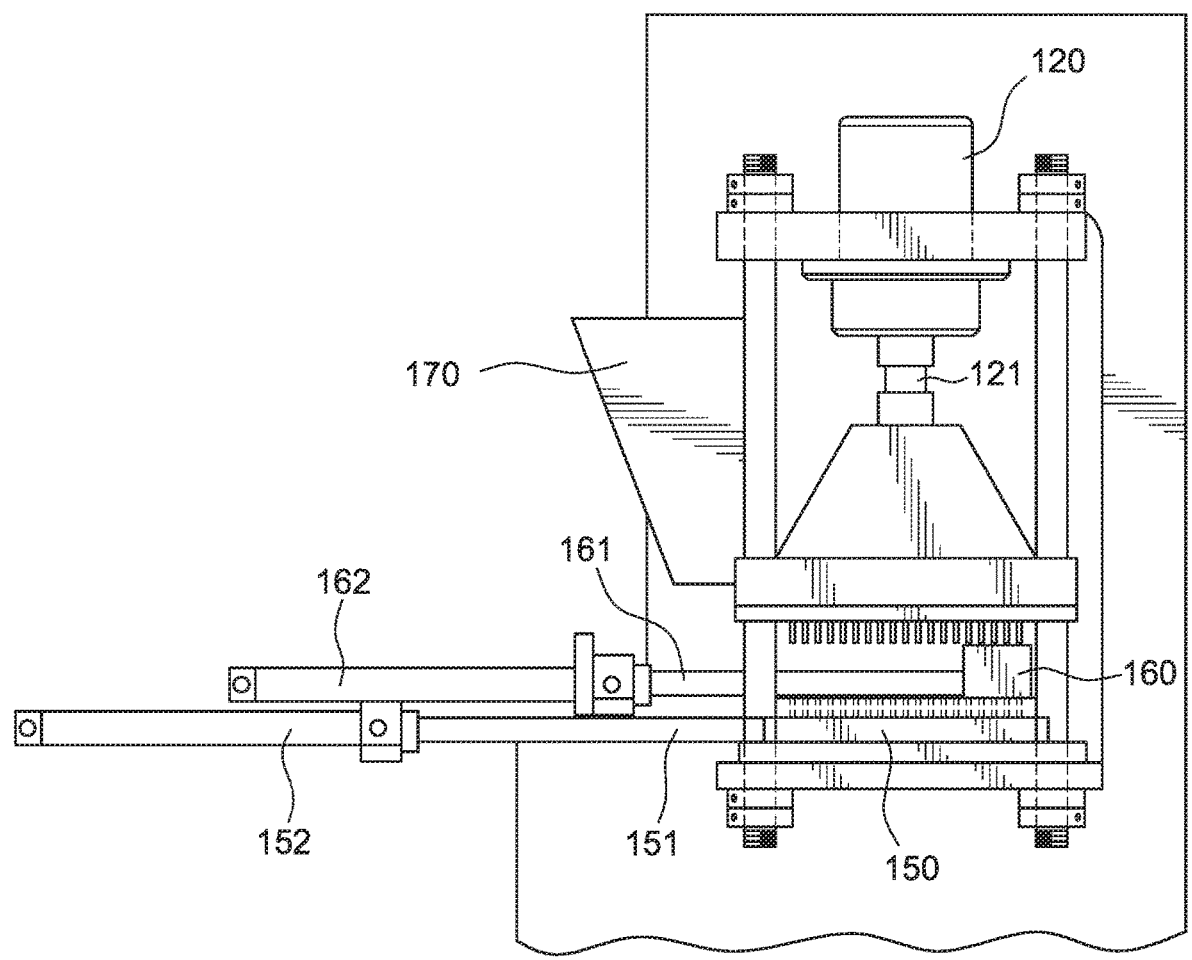
FIG. 3 depicts a right side view of the apparatus for the production of coir pith tablets of FIG. 1 with a moving hopper in a powder feeding position, in accordance with an exemplary embodiment of the disclosed subject matter.

FIG. 3 depicts a right side view of the apparatus for the production of coir pith tablets of FIG. 1 with the moving hopper 160 in a powder feeding position, in accordance with an exemplary embodiment of the disclosed subject matter. In FIG. 3, the moving hopper 160 has moved completely across the top of the fixed die 140 and filled or partially filled all of the openings 141 in the fixed die 140. The moving hopper 160 will now move back across the top of the fixed die 140 and complete the filling process and front and back walls of the moving hopper 160 will level off the coir pith to be about even with the top of each opening 141, so there is about 15 mm of coir pith in each opening 141.

Figure 4:
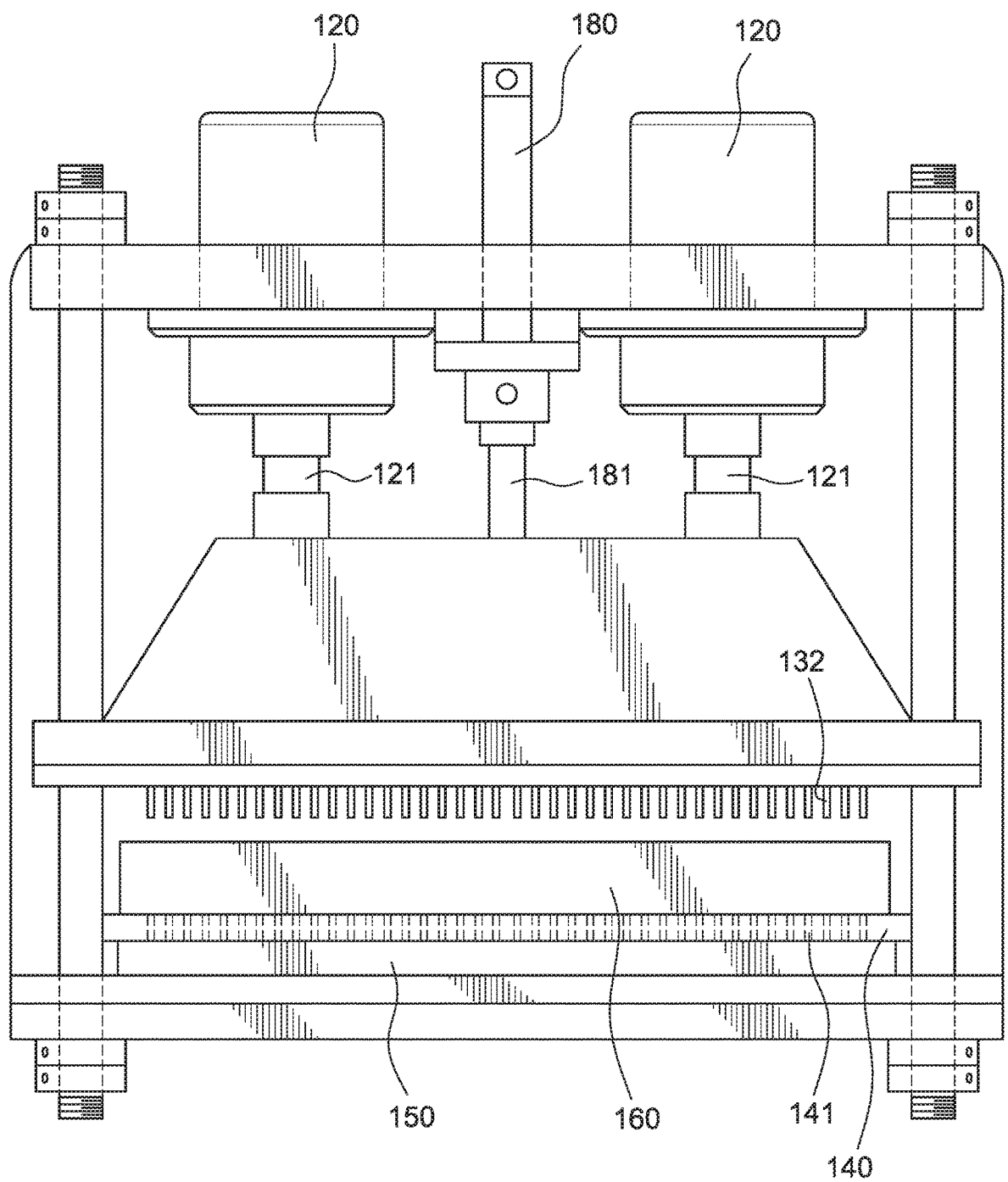
FIG. 4 depicts a front view of the apparatus for the production of coir pith tablets of FIG. 1 with a moving hopper in a powder feeding position, in accordance with an exemplary embodiment of the disclosed subject matter.

FIG. 4 depicts a front view of the apparatus for the production of coir pith tablets of FIG. 1 with a moving hopper in the powder feeding position shown in FIG. 3.

Figure 5:
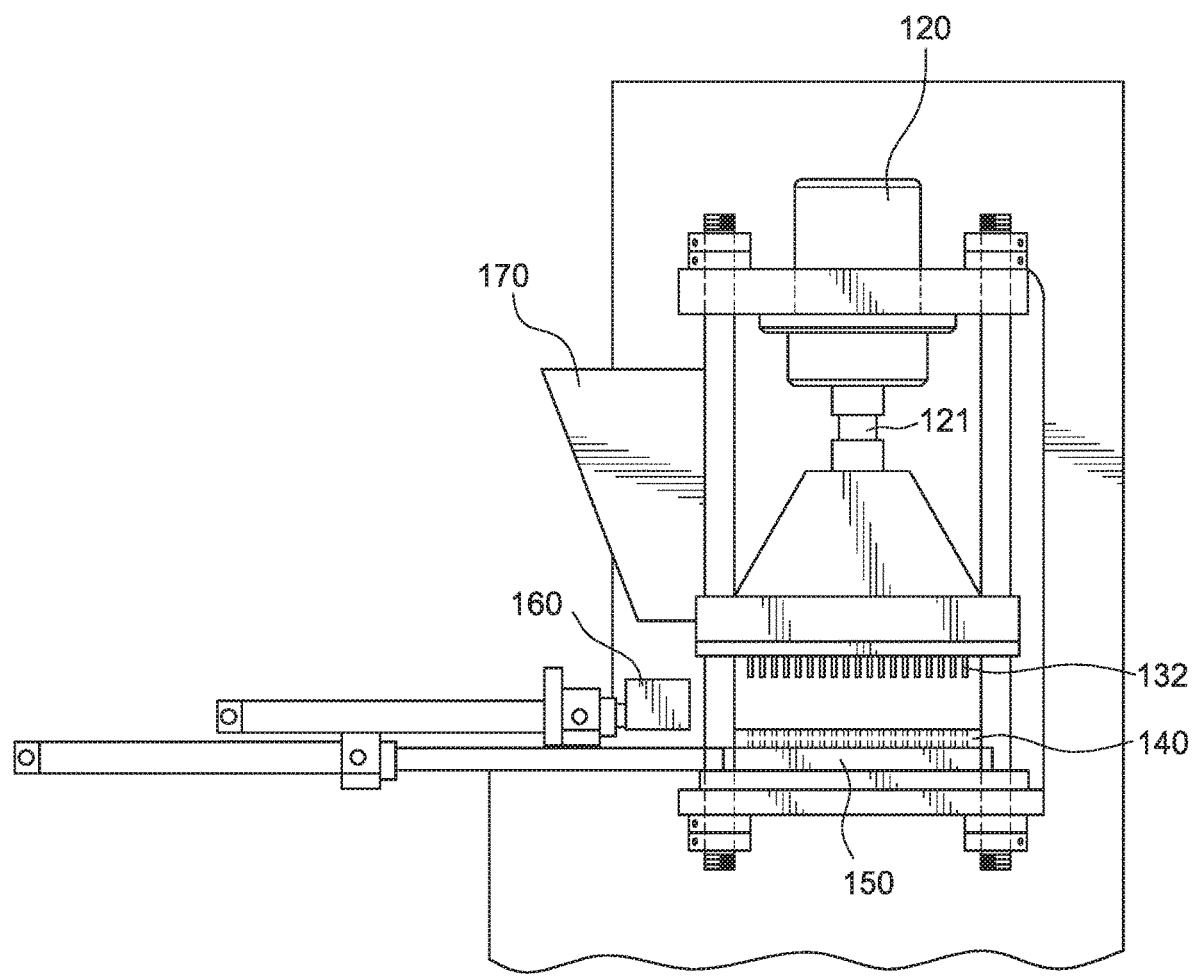
FIG. 5 depicts a right side view of the apparatus for the production of coir pith tablets of FIG. 1 after return of the moving hopper to the home position, in accordance with an exemplary embodiment of the disclosed subject matter.

FIG. 5 depicts a right side view of the apparatus for the production of coir pith tablets of FIG. 1 after return of the moving hopper 160 to the home position with all of the openings 141 in the fixed die 140 filled with coir pith.

Figure 6:
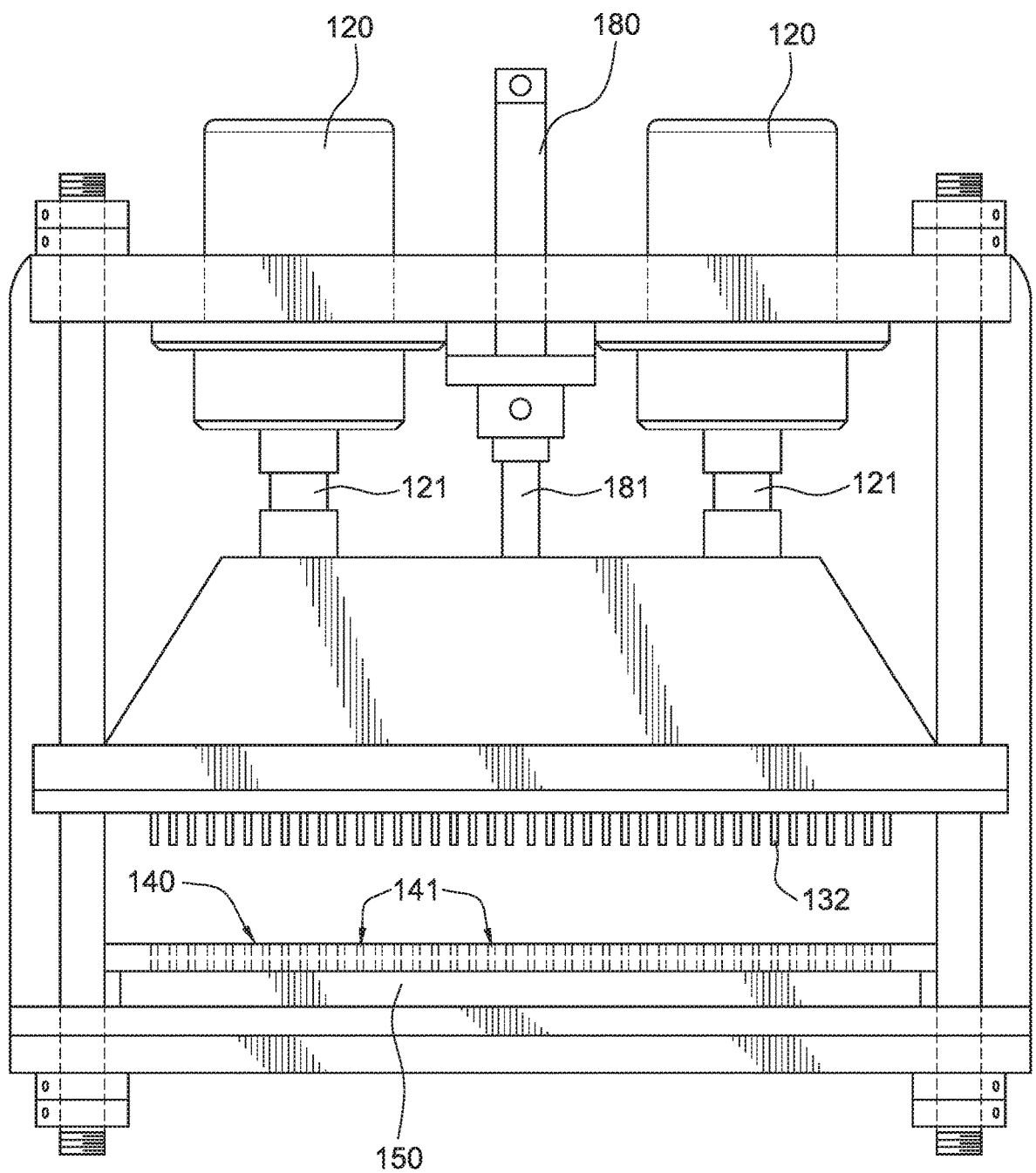
FIG. 6 depicts a front view of the apparatus for the production of coir pith tablets of FIG. 1 after return of the moving hopper to the home position, in accordance with an exemplary embodiment of the disclosed subject matter.

FIG. 6 depicts a front view of the apparatus for the production of coir pith tablets of FIG. 1 after return of the moving hopper to the home position of FIG. 5.

Figure 7:
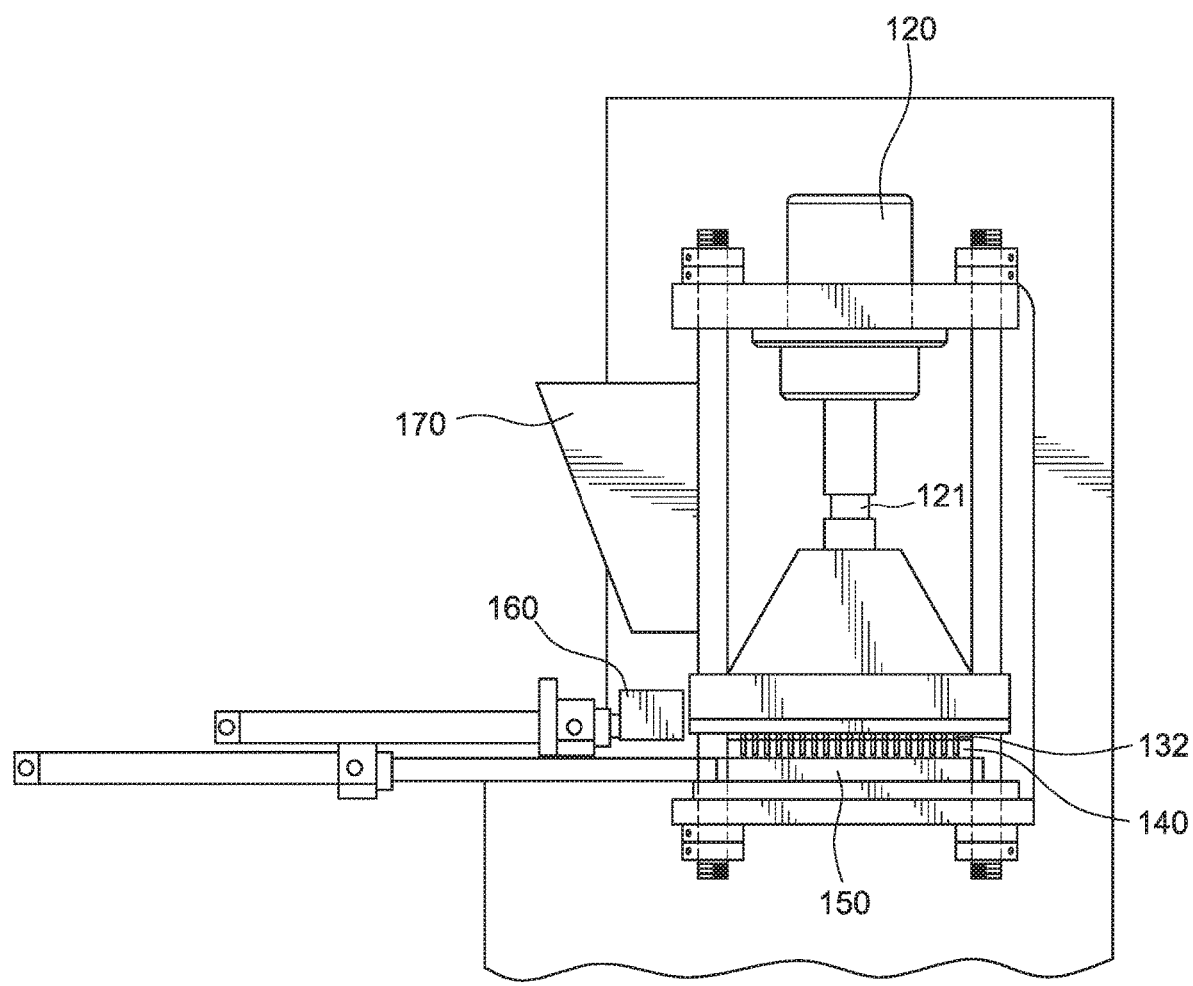
FIG. 7 depicts a right side view of the apparatus for the production of coir pith tablets of FIG. 1 with the dual hydraulic cylinders in the tablet pressing position, in accordance with an exemplary embodiment of the disclosed subject matter.

FIG. 7 depicts a right side view of the apparatus for the production of coir pith tablets of FIG. 1 with the dual hydraulic cylinders 120 in the down or tablet pressing position and the pins 132 inside of the openings 141 in the fixed die 140. The original about 15 mm volume of the coir pith has been compressed down to tablets 710 with about a 3 mm thickness, so about a 5 to 1 compression ratio.

Figure 8:
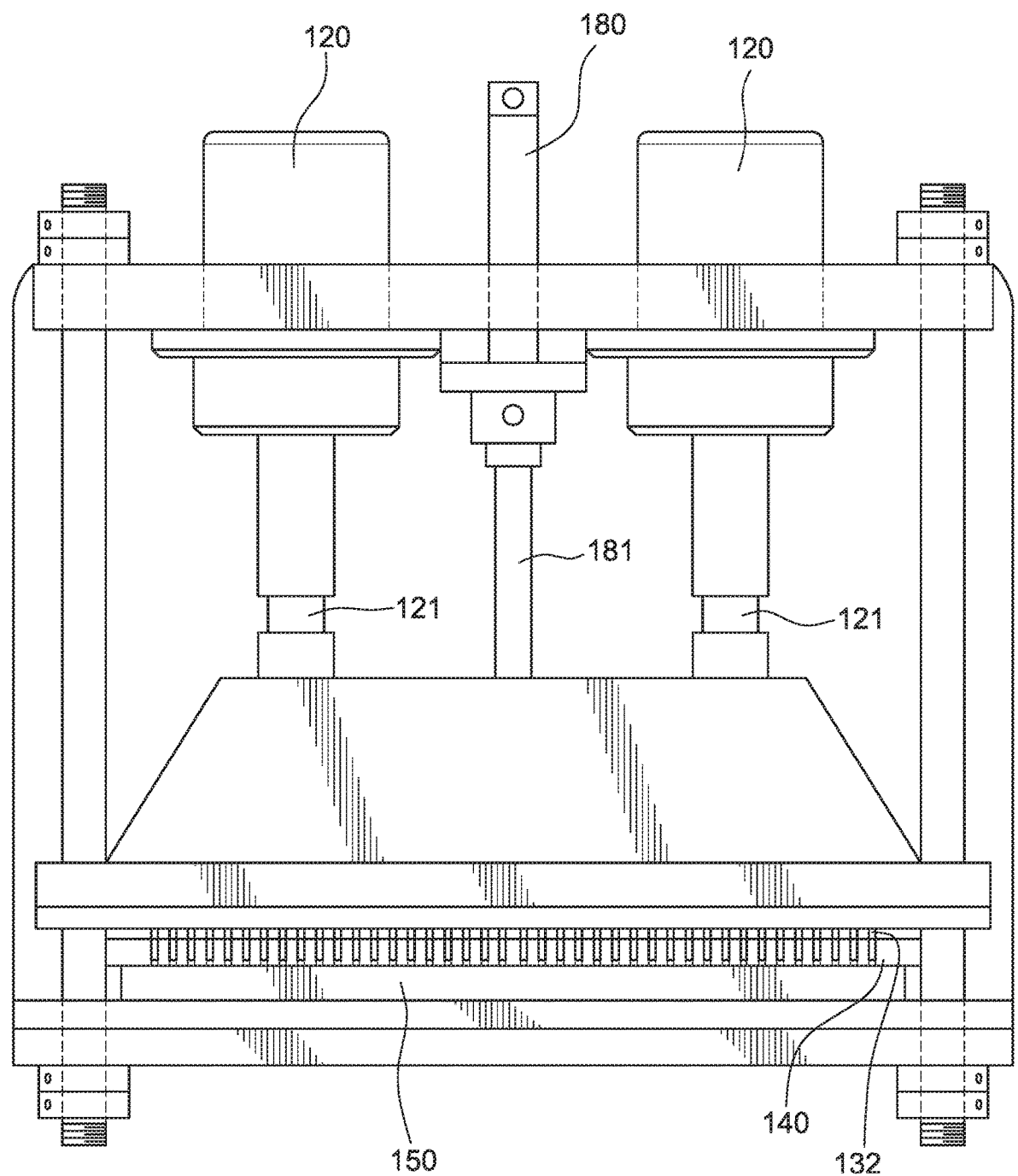
FIG. 8 depicts a front view of the apparatus for the production of coir pith tablets of FIG. 1 with the dual hydraulic cylinders in the tablet pressing position, in accordance with an exemplary embodiment of the disclosed subject matter.

FIG. 8 depicts a front view of the apparatus for the production of coir pith tablets of FIG. 1 with the dual hydraulic cylinders 120 in the tablet pressing position of FIG. 7. In FIG. 8, the pins 132 are seen to have compressed the coir pith down to tablets 710.

Figure 9:
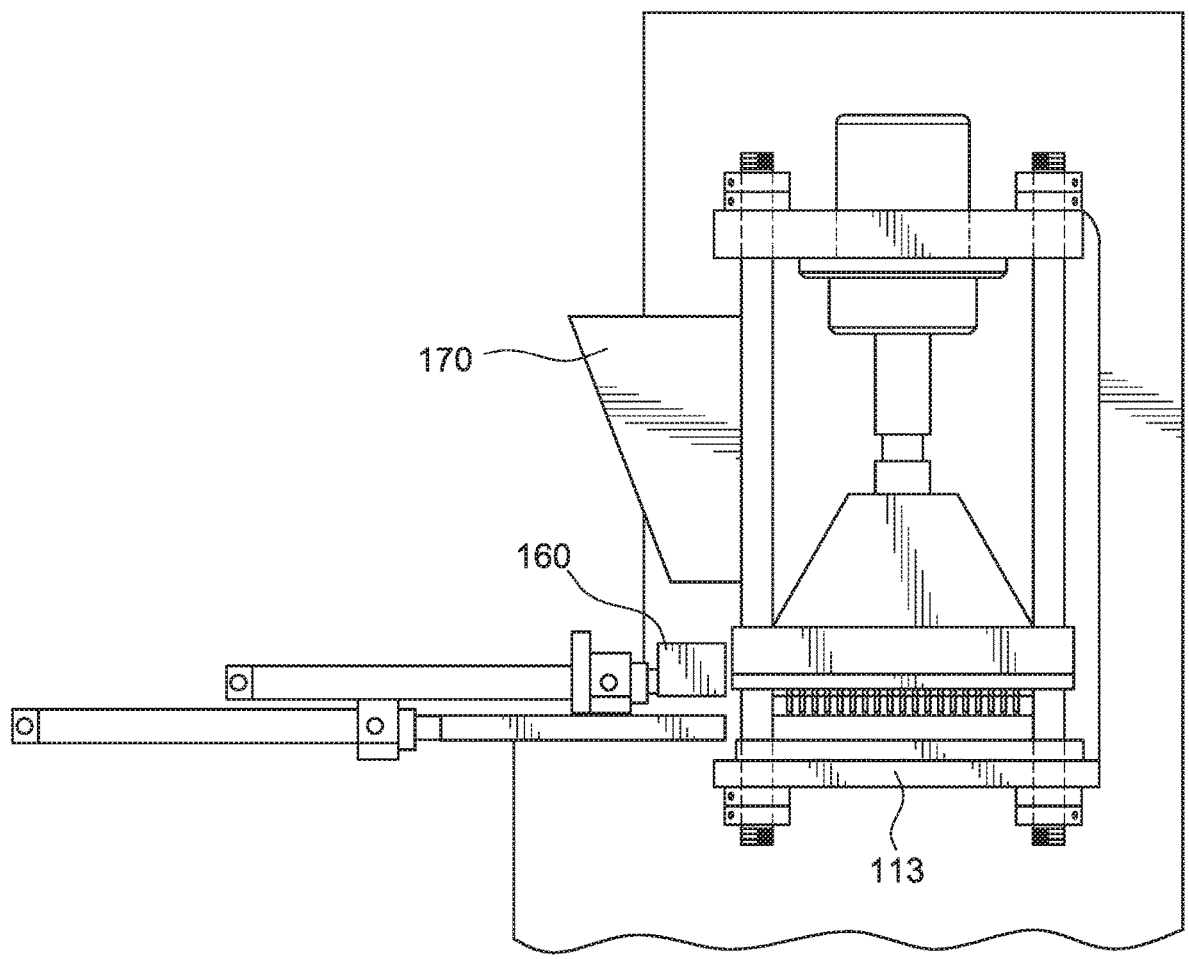
FIG. 9 depicts a right side view of the apparatus for the production of coir pith tablets of FIG. 1 with the dual hydraulic cylinders in a tablet ejection position, in accordance with an exemplary embodiment of the disclosed subject matter.

FIG. 9 depicts a right side view of the apparatus for the production of coir pith tablets of FIG. 1 with the moving door 160 and the dual hydraulic cylinders 120 in a tablet ejection position. After the pressure has been applied to the coir pith in the openings 141, the moving door 150 moves out from underneath the fixed die 140 to allow the pins 132 to move further down to push the compressed tablets 710 out the bottom of the fixed die 140.

Figure 10:
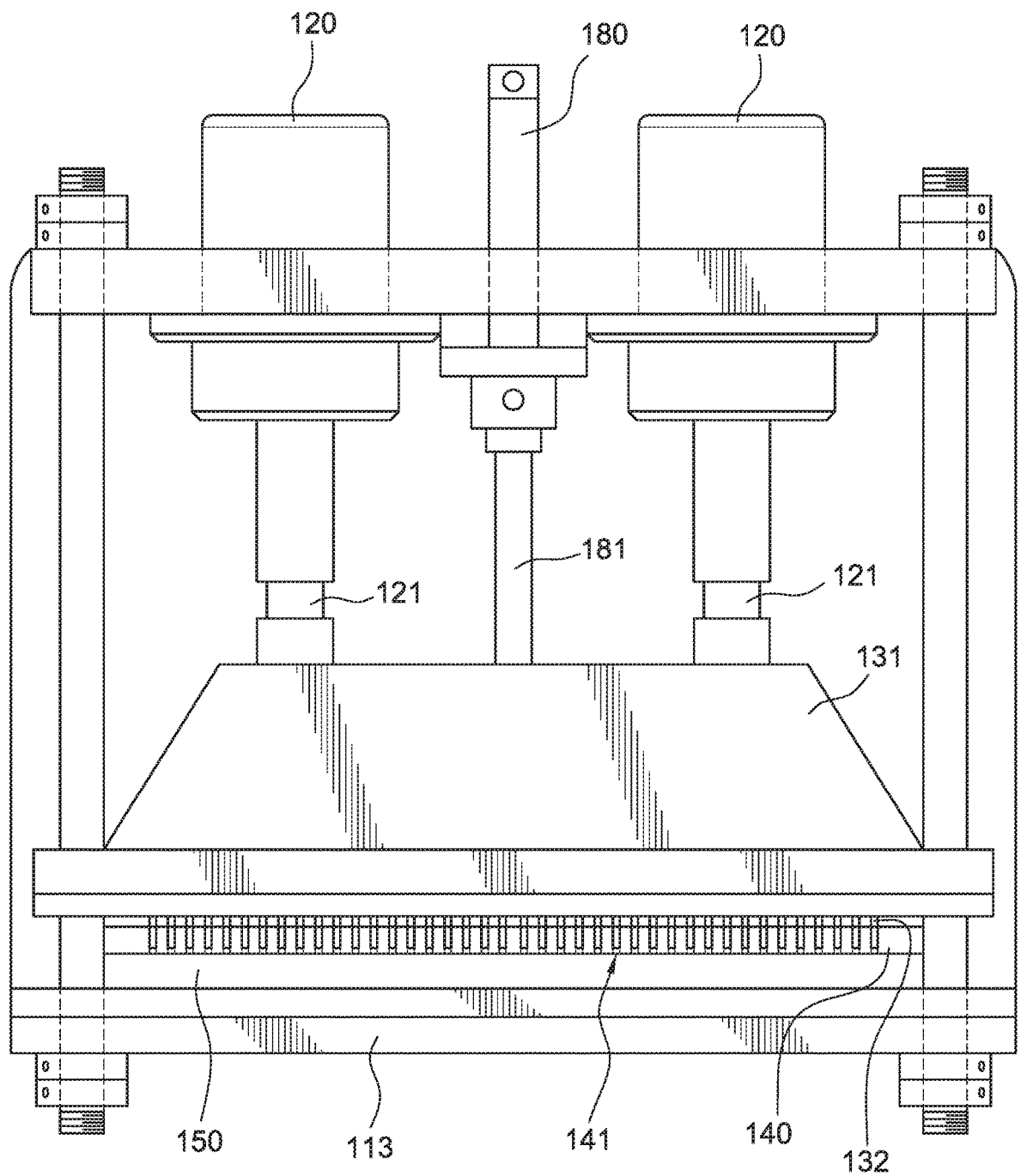
FIG. 10 depicts a front of the apparatus for the production of coir pith tablets of FIG. 1 with the dual hydraulic cylinders in the tablet pressing position, in accordance with an exemplary embodiment of the disclosed subject matter.

FIG. 10 depicts a front of the apparatus for the production of coir pith tablets of FIG. 1 with the dual hydraulic cylinders 120 in the tablet ejection position of FIG. 9.

Figure 11:
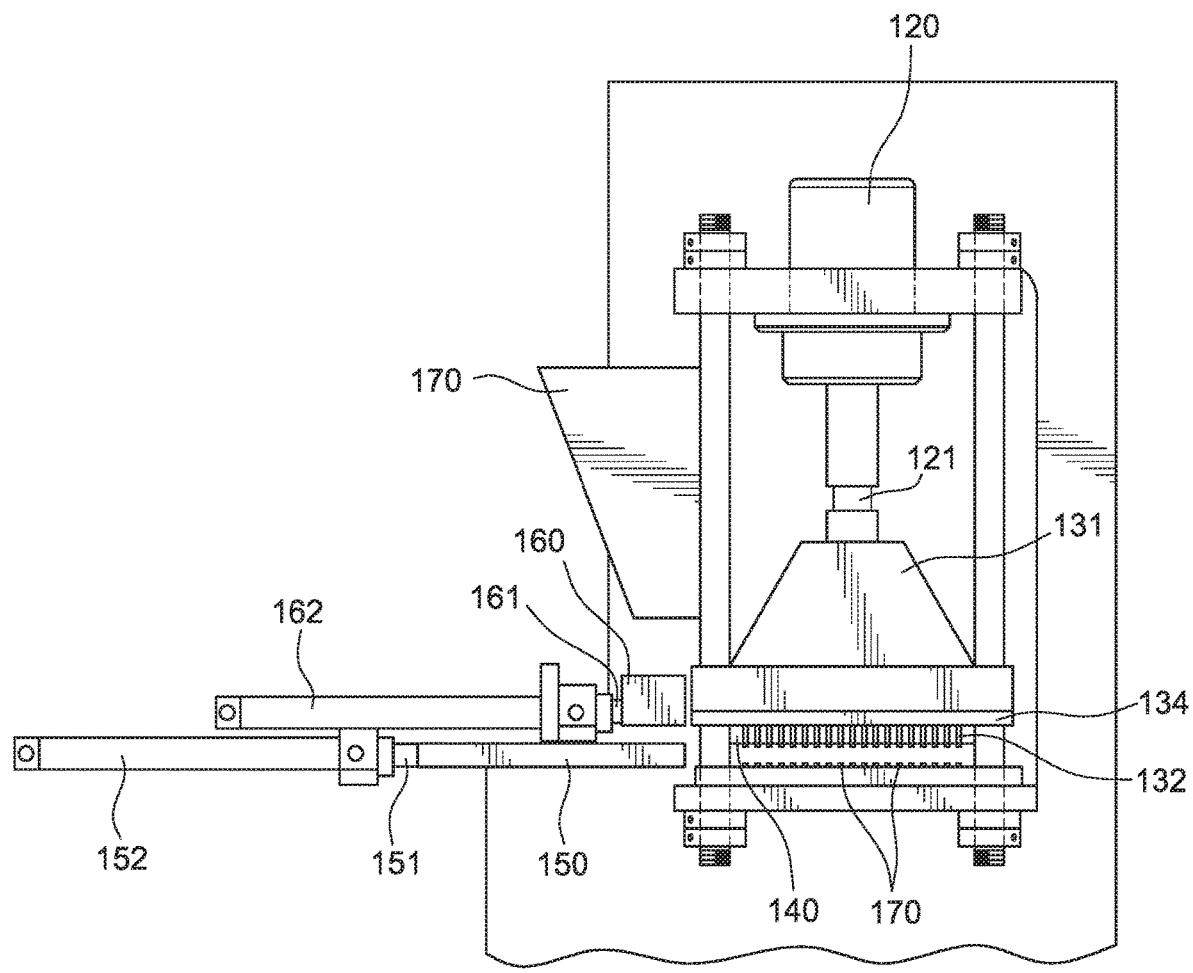
FIG. 11 depicts a right side view of the apparatus for the production of coir pith tablets of FIG. 1 with a moveable door in the tablet ejection position after the tablets have been ejected from the die, in accordance with an exemplary embodiment of the disclosed subject matter.

FIG. 11 depicts a right side view of the apparatus for the production of coir pith tablets of FIG. 1 with the moveable door 160 in the tablet ejection position after the tablets 710 have been ejected from the fixed die 140 and onto the top of the bottom plate 113.

Figure 12:
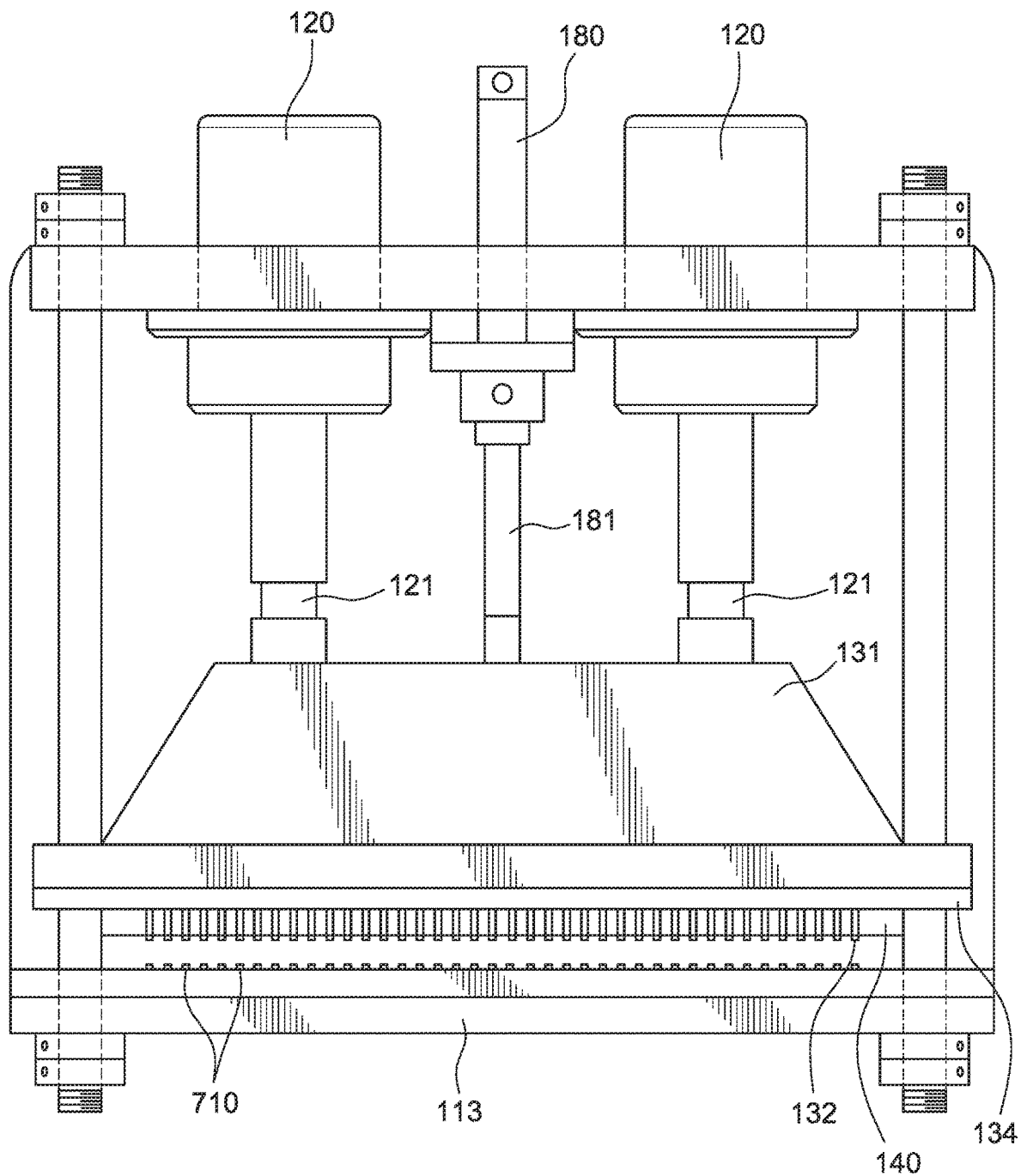
FIG. 12 depicts a front of the apparatus for the production of coir pith tablets of FIG. 1 with the moveable door in the tablet ejection position after the tablets have been ejected from the die, in accordance with an exemplary embodiment of the disclosed subject matter.

FIG. 12 depicts a front of the apparatus for the production of coir pith tablets of FIG. 1 with the moveable door in the tablet ejection position after the tablets 710 have been ejected from the die of FIG. 11.

Figure 13:
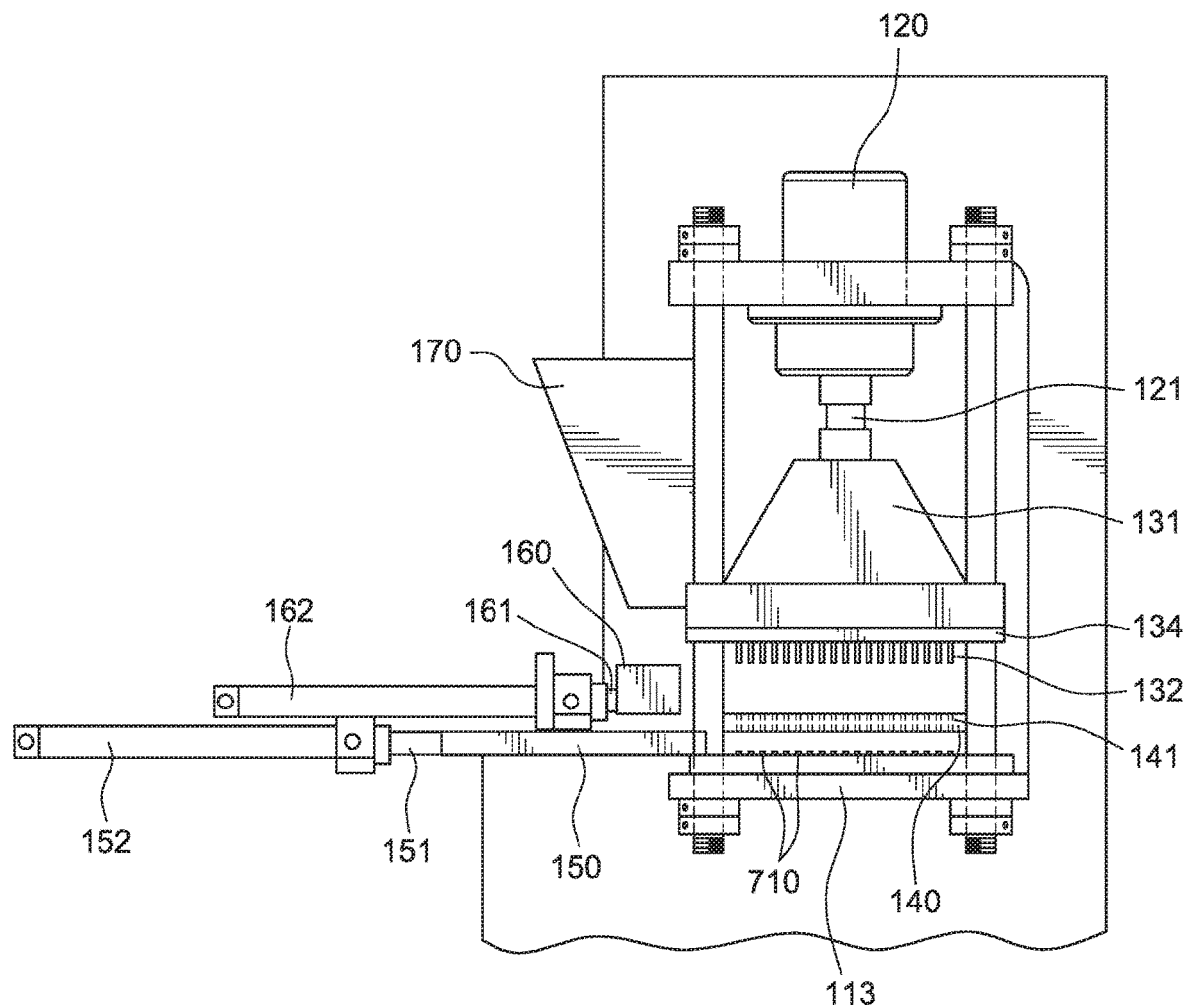
FIG. 13 depicts a right side view of the apparatus for the production of coir pith tablets of FIG. 1 with the dual hydraulic cylinders in the home position after the tablets have been ejected from the die, in accordance with an exemplary embodiment of the disclosed subject matter.

FIG. 13 depicts a right side view of the apparatus for the production of coir pith tablets of FIG. 1 with the dual hydraulic cylinders 120 in the home position after the tablets 710 have been ejected from the fixed die 140.

Figure 14:
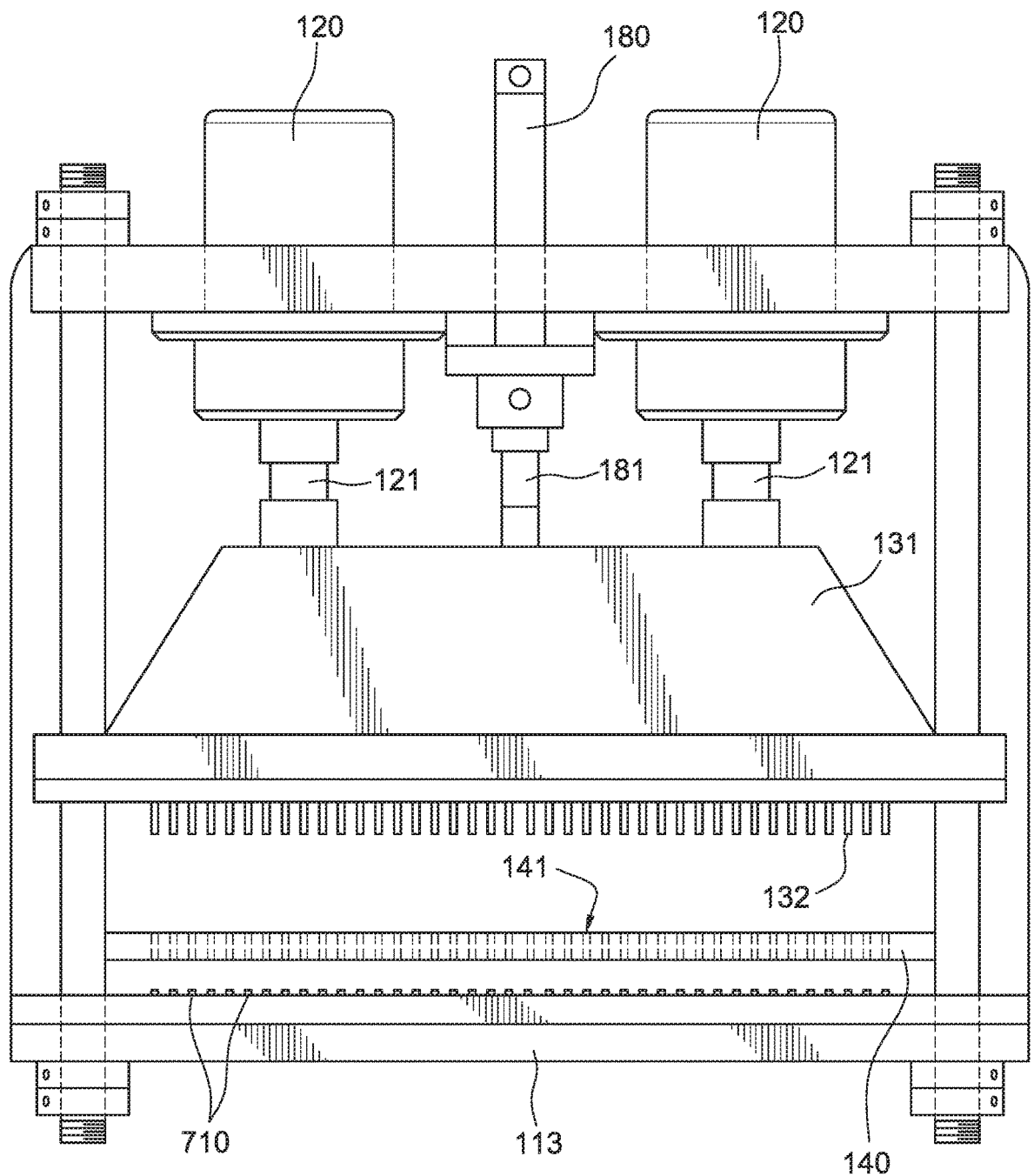
FIG. 14 depicts a front view of the apparatus for the production of coir pith tablets of FIG. 1 with the dual hydraulic cylinders in the home position after the tablets have been ejected from the die, in accordance with an exemplary embodiment of the disclosed subject matter.

FIG. 14 depicts a front view of the apparatus for the production of coir pith tablets of FIG. 1 with the dual hydraulic cylinders 120 in the home position after the tablets 710 have been ejected from the fixed die 140 of FIG. 13.

Figure 15:
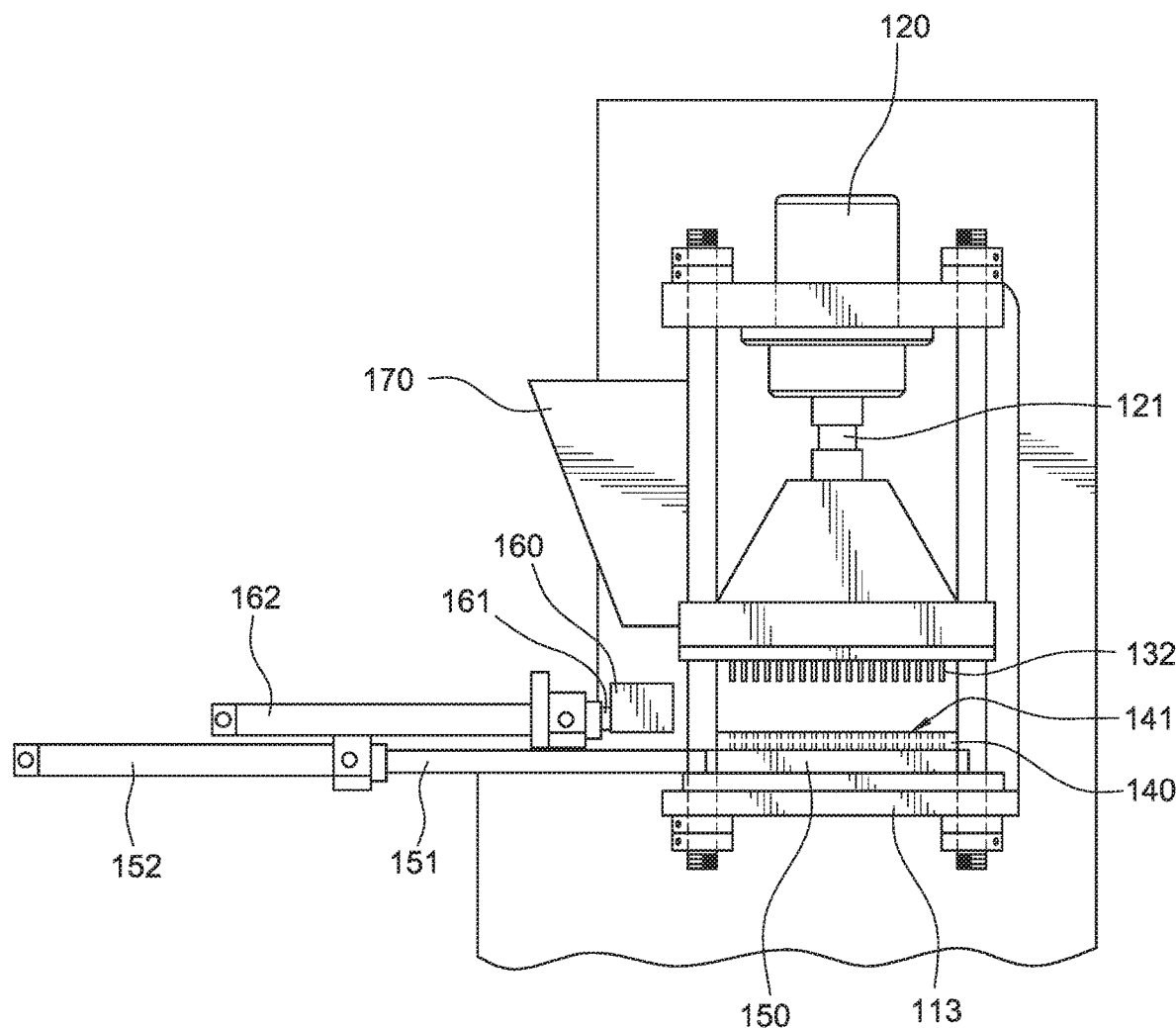
FIG. 15 depicts a right side view of the apparatus for the production of coir pith tablets of FIG. 1 with the dual hydraulic cylinders in the home position and the moving door in the tablet pressing position under the die, according to an exemplary embodiment of the disclosed subject matter.

FIG. 15 depicts a right side view of the apparatus for the production of coir pith tablets of FIG. 1 with the dual hydraulic cylinders 120 in the home position and the moving door 160 in the tablet pressing position under the fixed die 140.

Figure 16:
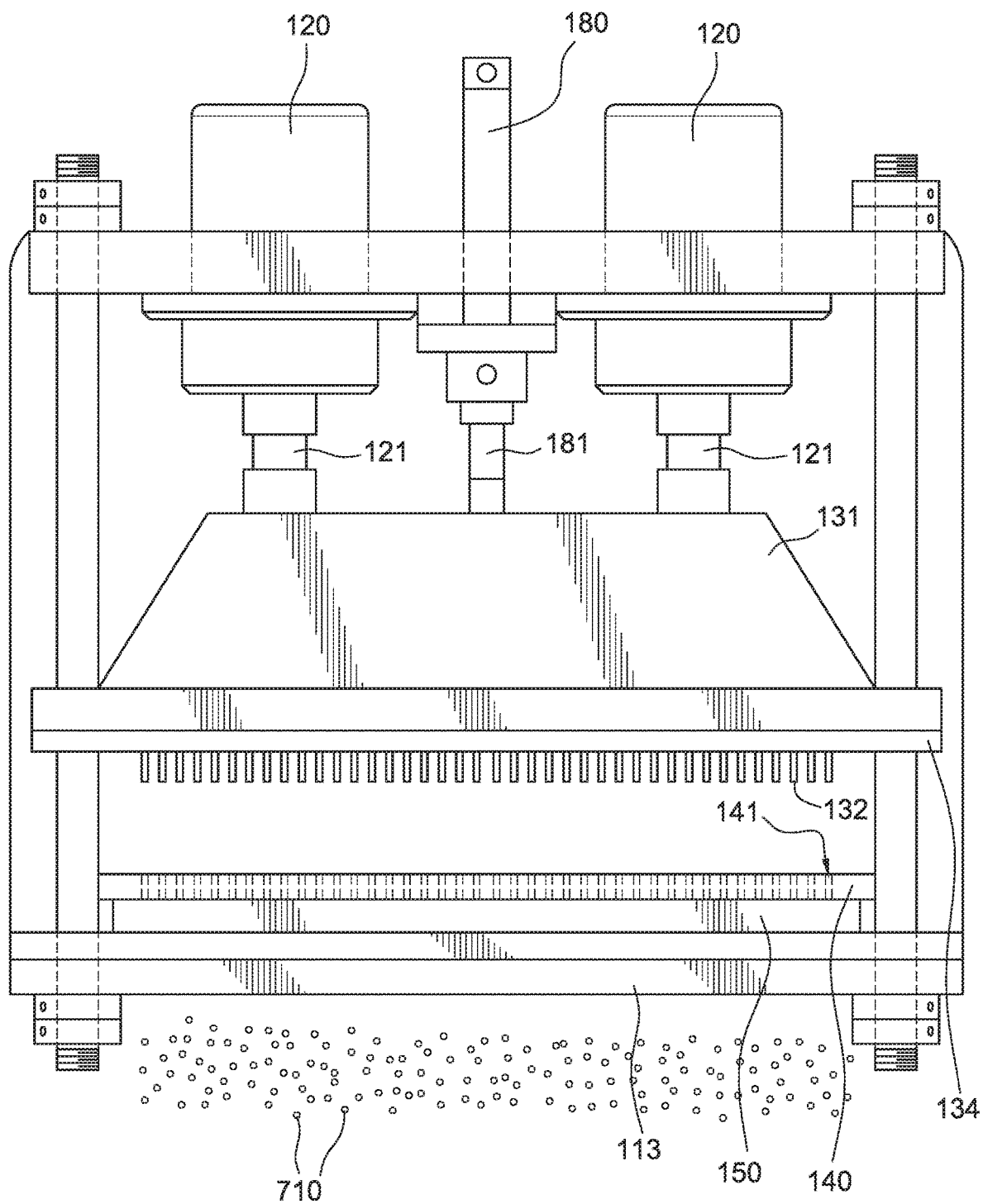
FIG. 16 depicts a front view of the apparatus for the production of coir pith tablets of FIG. 1 with the dual hydraulic cylinders in the home position and the moving door in the tablet pressing position under the die, in accordance with an exemplary embodiment of the disclosed subject matter.

FIG. 16 depicts a front view of the apparatus for the production of coir pith tablets of FIG. 1 with the dual hydraulic cylinders 120 in the home position and the moving door 160 in the tablet pressing position under the fixed die 140 of FIG. 15.

Figure 17:
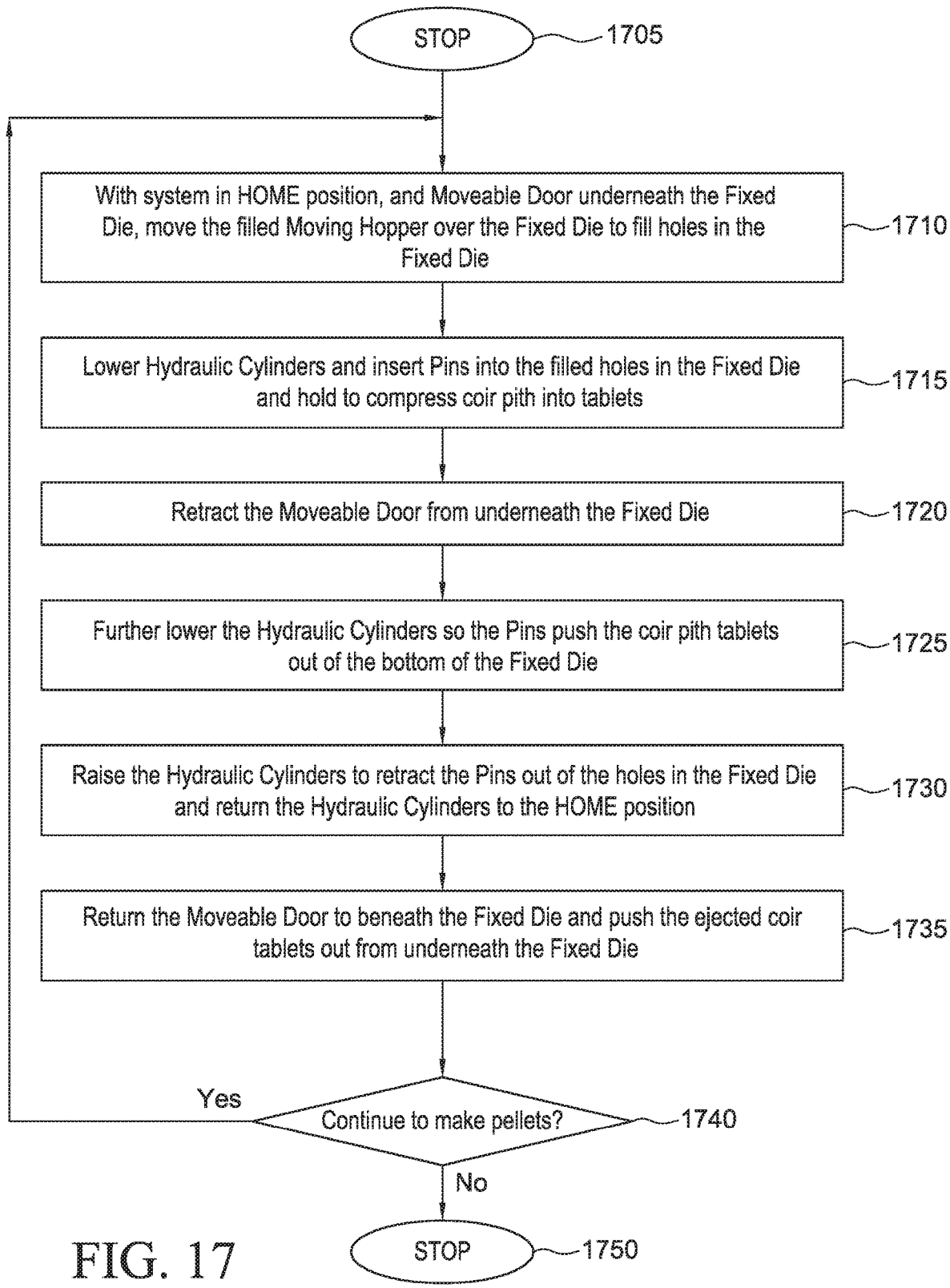
FIG. 17 depicts a flow chart of the process of making the coir pith tablets illustrated in FIGS. 1-16, in accordance with an exemplary embodiment of the disclosed subject matter.

FIG. 17 depicts a flow chart of the process of making the coir pith tablets illustrated in FIGS. 1-16, in accordance with an exemplary embodiment of the disclosed subject matter. In FIG. 17, the process starts 1705 and then, with the system in the HOME position, i.e., the dual hydraulic cylinders in the HOME or raised position and the moveable door underneath the fixed die, move 1710 the filled moving hopper back and forth over the fixed die to fill holes in the fixed die. This step can be performed once or more. Lower 1715 the dual hydraulic cylinders and insert the pins into the filled holes in the fixed die and hold to compress coir pith into tablets. Retract 1720 the moveable door from underneath the fixed die. Further lower 1725 the dual hydraulic cylinders so pins push the coir pith tablets out of the bottom of the fixed die. Raise 1730 the dual hydraulic cylinders to retract pins out of the holes in the fixed die and return dual hydraulic cylinders to the HOME position. Return 1735 the moveable door to beneath the fixed die and push the ejected coir pith tablets out from underneath the fixed die. Determine 1740 whether to make more tablets. If it is determined 1740 to make more tablets, so, YES, then, the process loops back to step 1710. If it is determined 1740 not to make more tablets, so, NO, then the process stops 1750. While the above process is described in relation to the dual hydraulic cylinder embodiment shown in FIGS. 1-16, it is equally application to use on systems with more or less hydraulic cylinders, for example, but not limited to, a system with only one hydraulic cylinder as shown and described below in FIGS. 18-25, or a system with three or more hydraulic cylinders.

Figure 18:
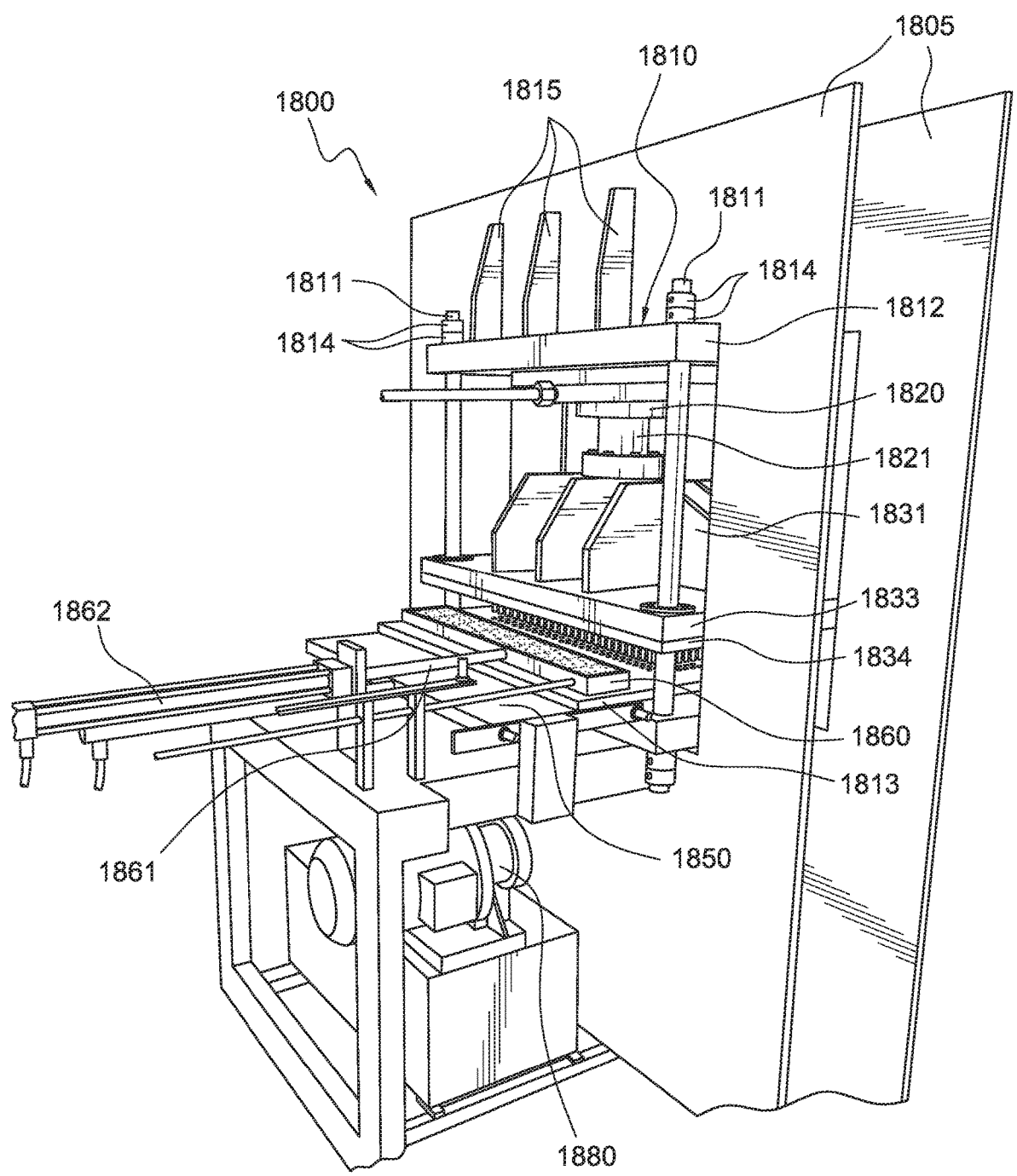
FIG. 18 depicts a right, front perspective view of another apparatus for the production of coir pith tablets with a single hydraulic cylinder in a home position, in accordance with an exemplary embodiment of the disclosed subject matter.

FIG. 18 depicts a right, front perspective view of another apparatus for the production of coir pith tablets with a single hydraulic cylinder in a home position, in accordance with an exemplary embodiment of the disclosed subject matter. In the embodiment in FIG. 18, the apparatus, a tablet press 1800, is a hydraulically driven system that includes an "O"-type frame structure 1805 made from two steel sheets through which windows have been cut to support a frame 1810 at an ergonomically desirable height. The steel sheets can have a thickness of about 16 mm and are reinforced by three (3) strengthening ribs 1815 attached on outside faces of each steel sheet 1805 equally spaced apart immediately above a middle of each opening and extending perpendicularly away from the outside faces of each steel sheet 1805.

In the embodiment in FIG. 18, the tablet press 1800, is a hydraulically driven system that includes the frame 1810 made of four vertical guide rods 1811, a top plate 1812, a bottom plate 1813 and multiple nuts 1814. Top ends of the guide rods 1811 are threaded and extend through openings in the top plate 1812 and are fastened to the top plate 1812 with 2 nuts 1814 each, which act to lock the nuts 1814 in place. One main hydraulic cylinder 1820 is affixed through and to the top plate 1812 and the main hydraulic cylinder 1820 includes a main hydraulic cylinder piston 1821 extending vertically out of a bottom of the main hydraulic cylinder 1820. The main hydraulic cylinder piston 1821 is configured to move vertically up and down and toward and away from the bottom plate 1813. A bottom end of the main hydraulic cylinder piston 1821 is connected to a top portion 1831 of a moveable punch 1830 that has 520 pins 1832 extending from a bottom surface. The top portion 1831 has an open trapezoidal shape, which helps ensure even pressure is applied to the moveable punch 1830 and the pins 1832. The top portion is formed from sections of steel sheet and cut and welded together using two spaced apart longitudinal walls and three spaced apart lateral walls.

Figure 21:
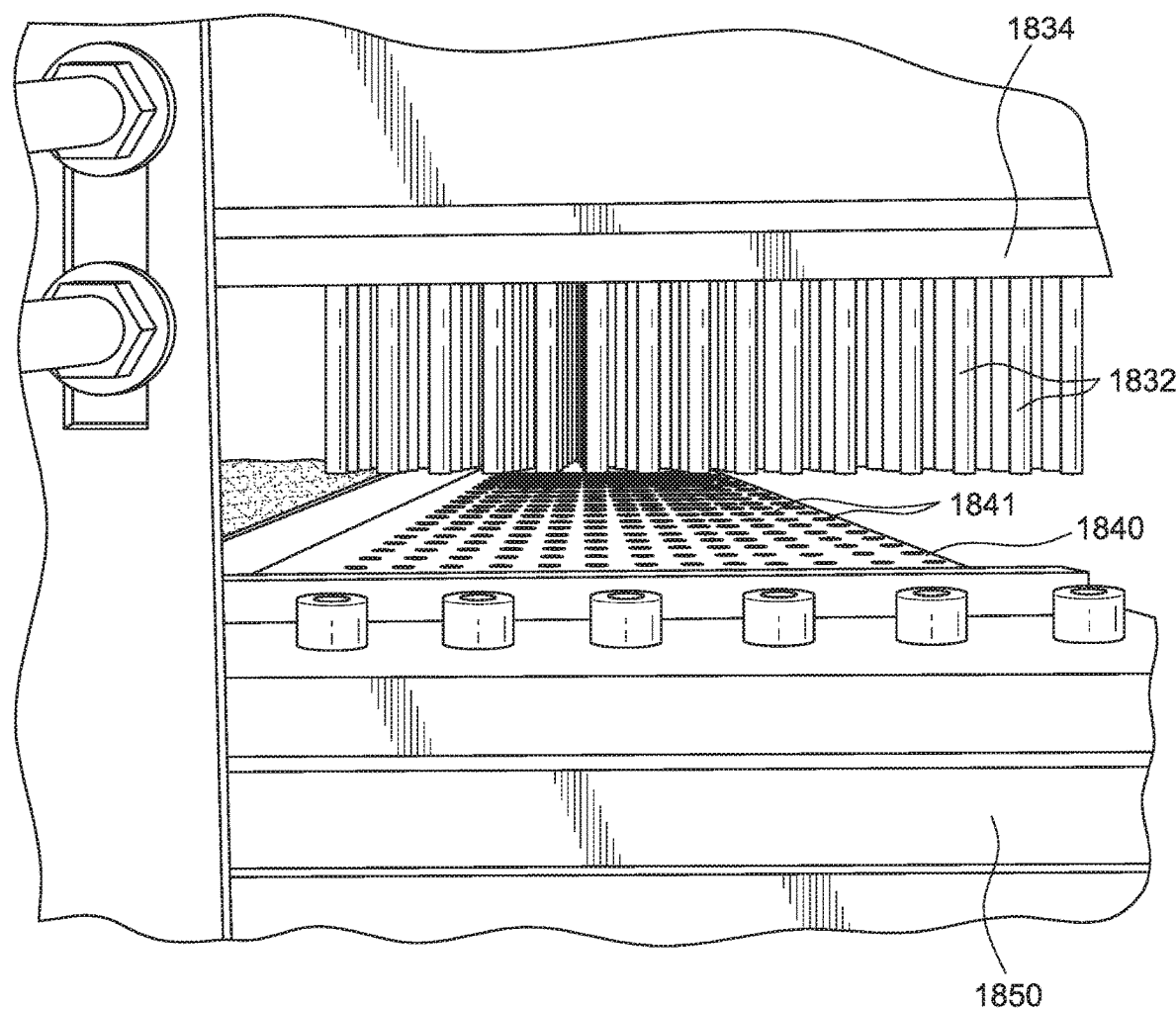
FIG. 21 depicts a back view of the another apparatus for the production of coir pith tablets of FIG. 18 with a single hydraulic cylinder in a home position showing rows of pins for forming the coir pith tablets, in accordance with an exemplary embodiment of the disclosed subject matter.

In FIG. 18, the moveable punch 1830 has a punch main plate backer 1833 above a punch main plate 1834 and each has four holes formed through it adjacent the four corners of the punch main plate backer 1833 and the punch main plate 1834 and through which the vertical guide rods 1811 extend and along which the punch main plate backer 1833 and the punch main plate 1834 are able to move vertically. Adjacent to and above the bottom plate 1813 is affixed a fixed die 1840 through which are formed 520 openings 1841 (best seen in FIG. 24) that are sized and configured to receive the 520 pins 1832 on the moveable punch 1830. Immediately below the fixed die 1840 is a moveable door 1850, which is connected to a hydraulic door cylinder 1852 via a hydraulic door piston 1851 (best seen in FIG. 19). The moveable door 1850 can be moved from immediately beneath the fixed die 1840 to cover/close the bottom open ends of each of the openings 1841 to outside the tablet press 1800 to open the bottom open ends of each of the openings 1841. As seen in FIG. 21, the moveable door 1850 is immediately beneath the fixed die 1840 to cover/close the bottom open ends of each of the openings 1841. Returning to FIG. 18, a moving hopper 1860 can move from outside the frame 1810 and move over and across the fixed die 1840. The moving hopper 1860 is connected by a hydraulic moving hopper piston 1861 to and moved by a hydraulic moving hopper cylinder 1862. If the moving hopper 1860 is filled with coir pith, it can fill each of the openings 1841 with the coir pith as it passes over each of the openings 1841. Although not shown, a fixed hopper 1870 can be attached to an outside of the frame 1810 and located immediately above the moving hopper 1860 when the moving hopper 1860 is moved to be outside of the frame. The fixed hopper 1870 can include an openable bottom to refill the moving hopper 1860 after it has moved across the fixed die 1840 and filled all of the openings 1841. The fixed hopper 1870 can also include an open top through which coir pith is filled. The fixed hopper 1870 can be operated manually or automatically when the moving hopper 1860 returns to be outside of the frame.

In the embodiment of the disclosed subject matter in FIG. 18, the main hydraulic cylinder 1820 piston 1821 can have a diameter of about 250 mm, the hydraulic door piston 1851 can have a diameter of about 50 mm and the hydraulic moving hopper piston 1861 can have a diameter of 50 mm. Also, the guide rods 1811 can have a diameter of 50 mm. Each pin 1832 has a diameter of 7.5 mm and is made of oil hardening non shrinking steel (OHNS), and each opening 1841 has a diameter of 7.5 mm and the length of each opening 1841 is 15 mm. The punch main plate 1834 and the moving door 1860 each have a thickness of 50 mm. A motor 1880, for example, a five (5) horsepower (hp) motor 1880, is used to run the tablet press 1800 and power a hydraulic pump system (not shown) to compress the coir pith in the holes down with the pins 1832 from 15 mm to 3 mm using about a 110 ton load. This is equivalent to 115 Bar Pressure or about 1, 668 psi and is applied for about 15 seconds or more.

The steel sheets 1805 are positioned parallel to each other and immediately inside of and adjacent to the guide rods 1811.

Figure 19:
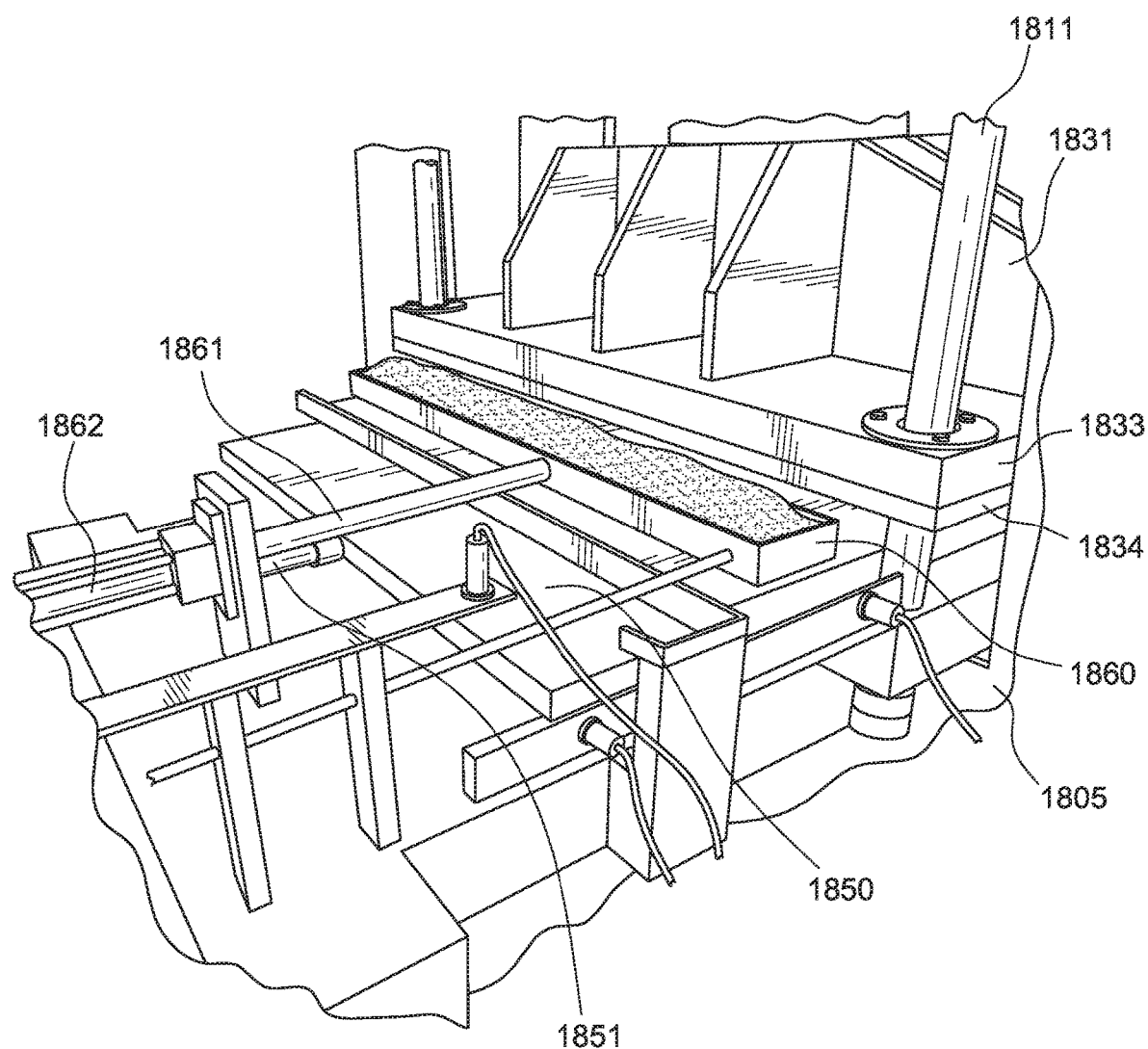
FIG. 19 depicts a right, front, close-up perspective view of the another apparatus for the production of coir pith tablets of FIG. 18 with a single hydraulic cylinder in a home position, in accordance with an exemplary embodiment of the disclosed subject matter.

FIG. 19 depicts a right, front, close-up perspective view of another apparatus 1800 for the production of coir pith tablets of FIG. 18 with the single hydraulic cylinder 1820 in the home position. In FIG. 19, the moving hopper 1860 is filled with coir pith and ready to be moved over top of the fixed die 1840 to fill the openings 1841. The moveable door 1850 is shown in the retracted position, so the bottoms of the openings 184 on the fixed die 1840 are uncovered.

Figure 20:
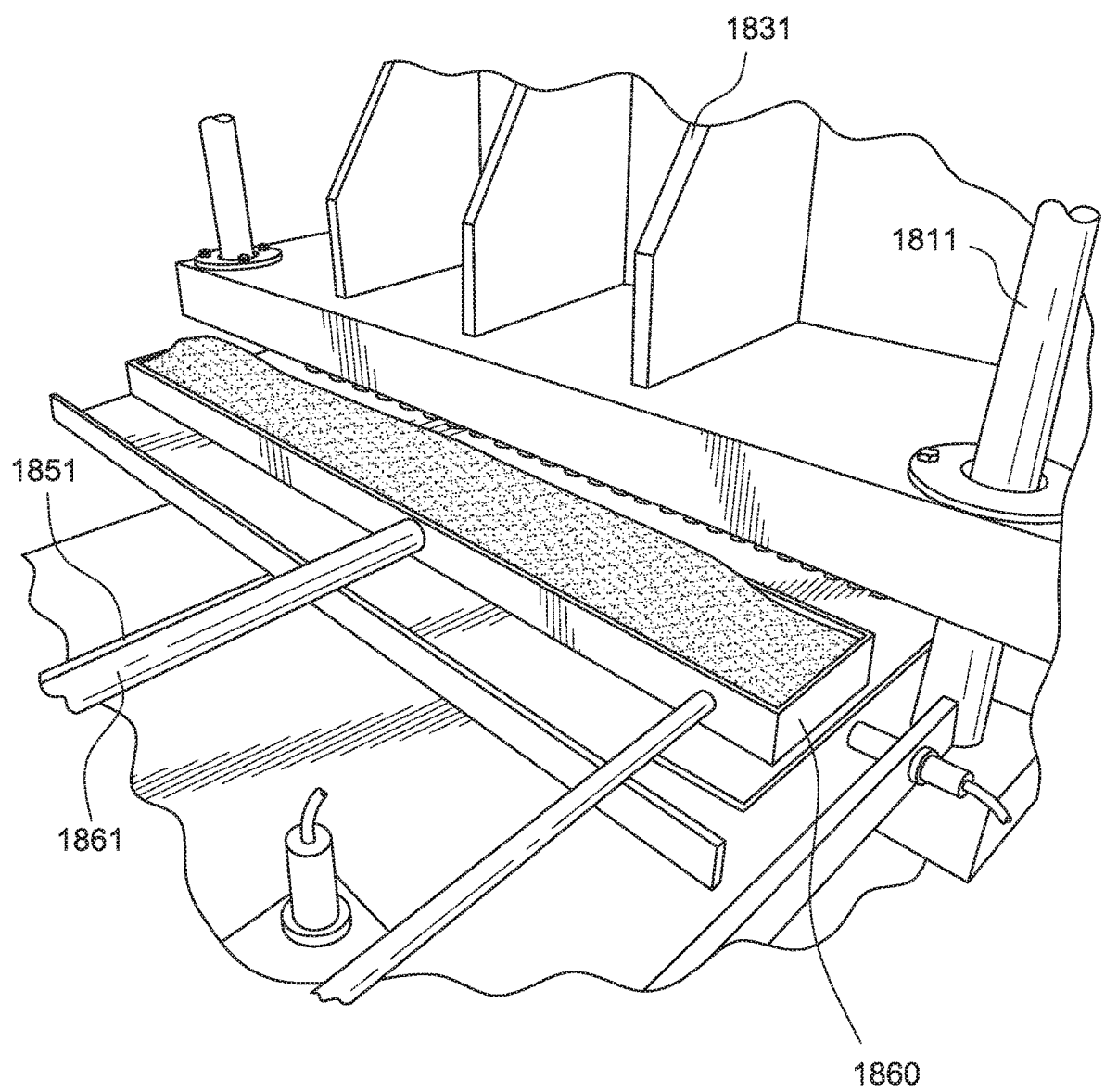
FIG. 20 depicts a right, front, perspective view of a moving hopper of the another apparatus for the production of coir pith tablets of FIG. 18 with a single hydraulic cylinder in a home position, in accordance with an exemplary embodiment of the disclosed subject matter.

FIG. 20 depicts a right, front, perspective view of the moving hopper 1860 of the another apparatus 1800 for the production of coir pith tablets of FIG. 18 with the single hydraulic cylinder 1820 in the home position and the moveable door 1850 in the extended position, so the bottoms of the openings 1841 on the fixed die 1840 are covered and closed. In this position the press 1800 is ready to fill the openings 1841 with coir pith and then compress the coir pith into a tablet.

FIG. 21 depicts a side view of the another apparatus 1800 for the production of coir pith tablets of FIG. 18 with a single hydraulic cylinder 1820 in a home position showing rows of pins for forming the coir pith tablets raised above the fixed die 1840 to permit the moving hopper to move across the fixed die 1840 and fill the openings 1841 with coir pith.

Figure 22:
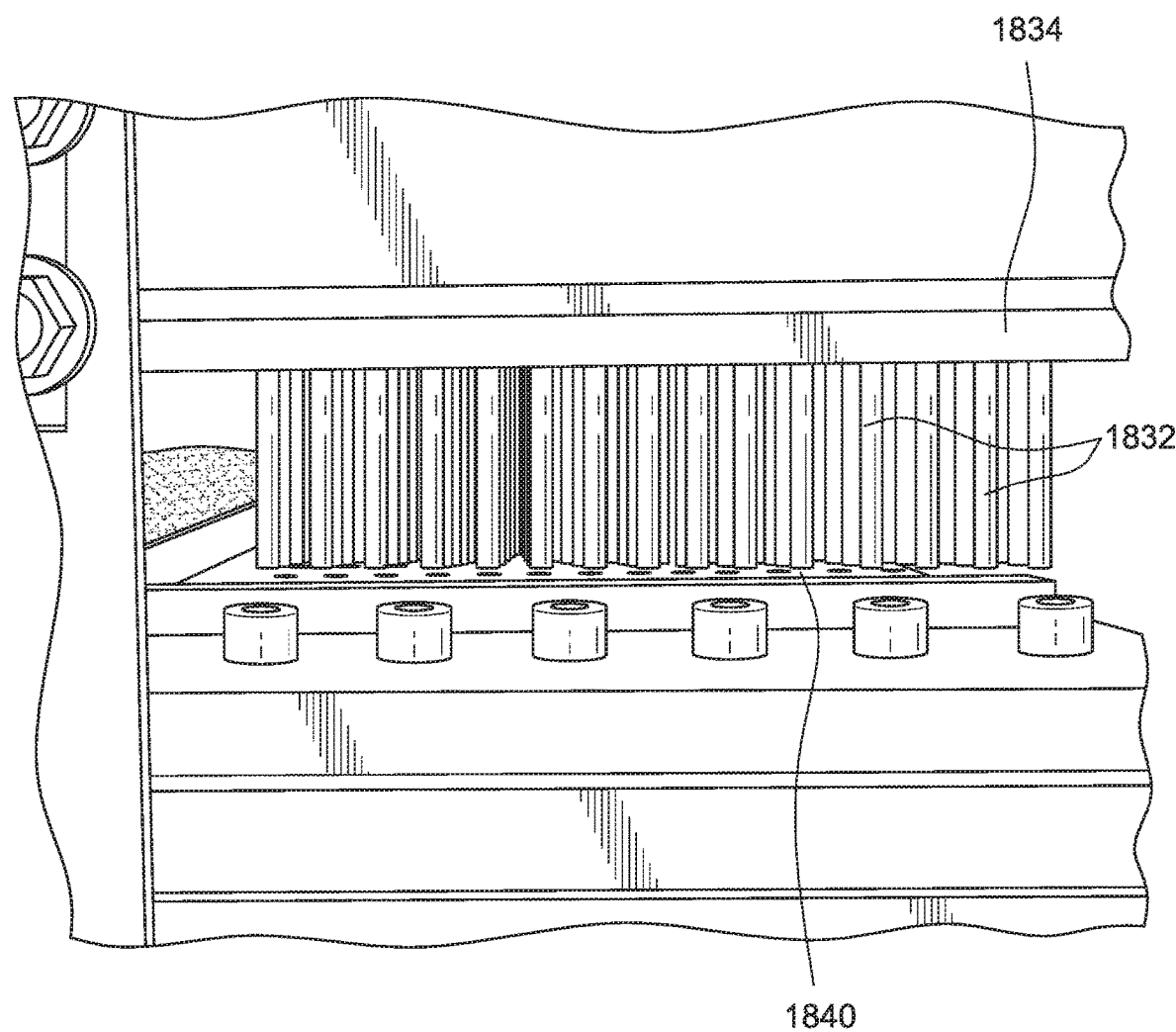
FIG. 22 depicts a back view of the another apparatus for the production of coir pith tablets of FIG. 18 with a single hydraulic cylinder in a lowered position showing rows of pins for forming the coir pith tablets, in accordance with an exemplary embodiment of the disclosed subject matter.

FIG. 22 depicts a side view of the another apparatus 1800 for the production of coir pith tablets of FIG. 18 with the single hydraulic cylinder 1820 in a lowered position showing rows of pins for forming the coir pith tablets. In FIG. 22, the moving hopper 1860 has moved across and back over the fixed die 1840 and filled the openings 1841 therein with coir pith.

Figure 23:
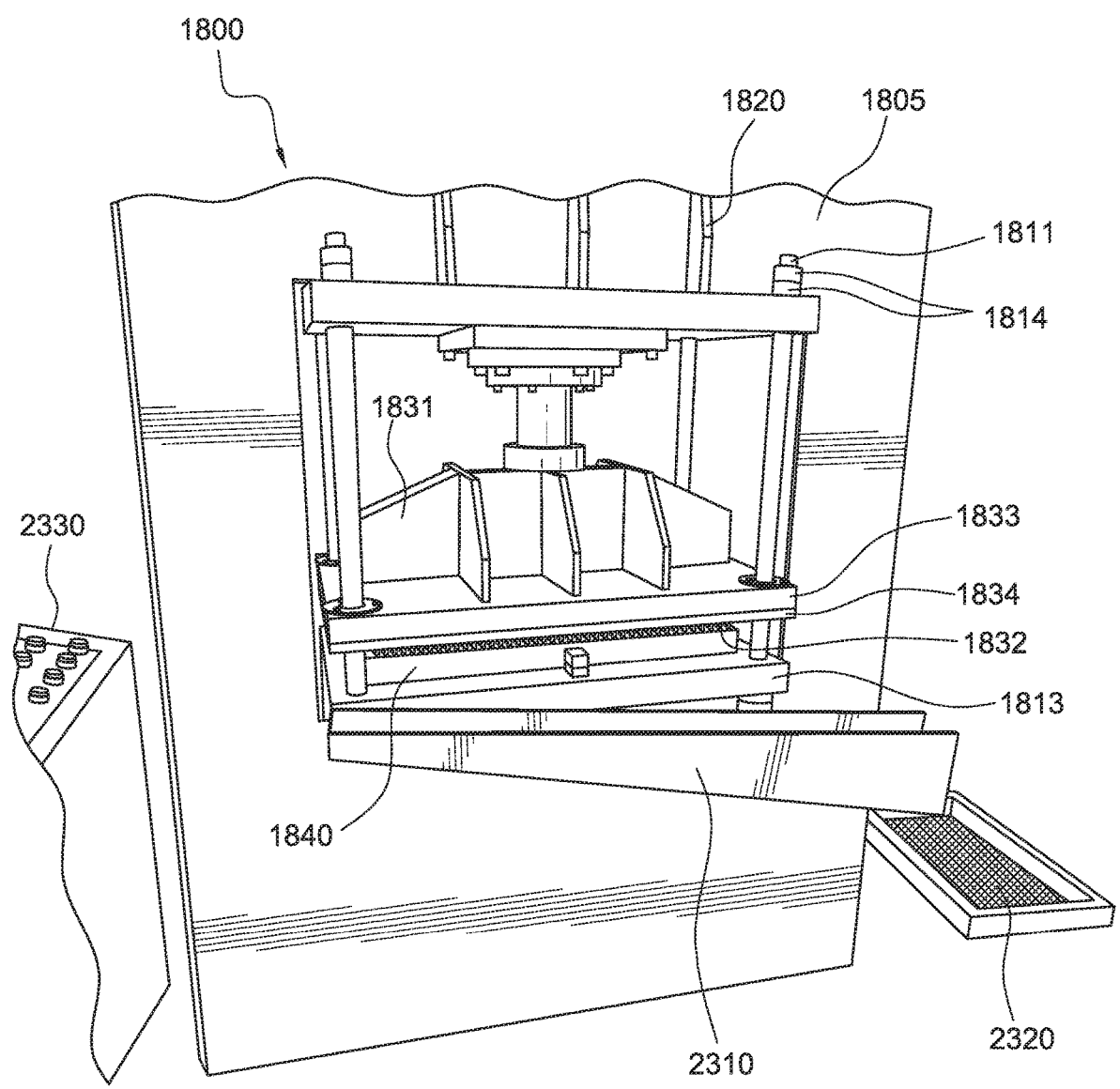
FIG. 23 depicts a back view of the another apparatus for the production of coir pith tablets of FIG. 18 with a single hydraulic cylinder in a tablet pressing position for forming the coir pith tablets, in accordance with an exemplary embodiment of the disclosed subject matter.

FIG. 23 depicts a back view of the another apparatus 1800 for the production of coir pith tablets of FIG. 18 with the single hydraulic cylinder 1820 in a tablet pressing position for forming the coir pith tablets. In FIG. 23, an output or tablet trough 2310 is seen attached to the back side of the base plate 1813 to catch the newly formed tablets as they are ejected from the tablet press 1800. The tablet trough 2310 is set at a downward angle to aid in the movement of the tablets down the tablet trough 2310 to be separated from any excess coir pith that may also have been ejected. This can be accomplished by catching the ejected tablets and coir pith in a mesh-type screen 2320, which retains the formed tablets and allows the excess coir pith to fall through the mesh in the mesh-type screen 2320. A control console 2330 is connected to the tablet press 1800, which includes a computer processor and software for controlling the operation of the tablet press 1800, the motor 1880 and associated hydraulic pump system to manufacture the coir pith tablets.

Figure 24:
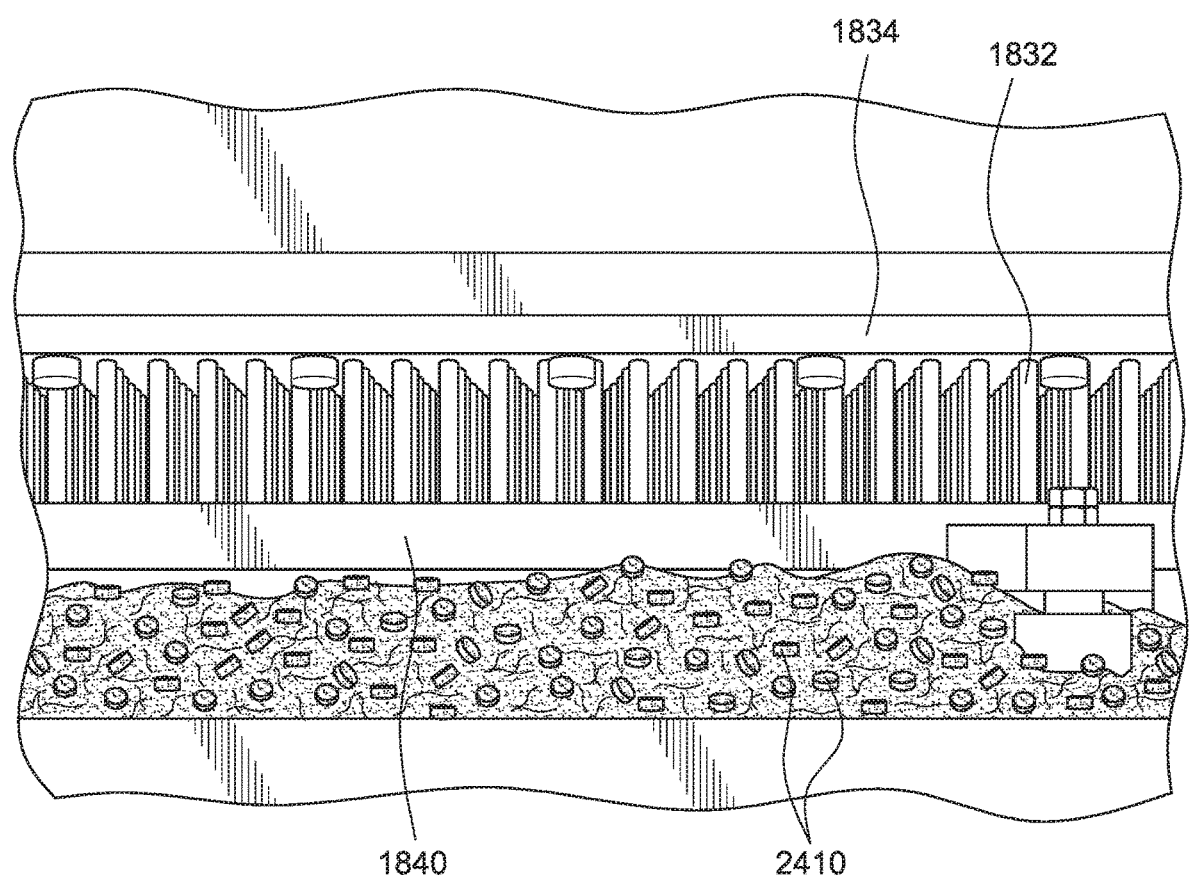
FIG. 24 depicts a back view of the another apparatus for the production of coir pith tablets of FIG. 18 with a single hydraulic cylinder in a raised position showing the rows of pins for forming the coir pith tablets just above the die and newly formed coir pith tablets and excess coir, in accordance with an exemplary embodiment of the disclosed subject matter.

FIG. 24 depicts a back view of the another apparatus 1800 for the production of coir pith tablets of FIG. 18 with the single hydraulic cylinder 1820 in the lowered position showing the rows of pins 1832 for forming the coir pith tablets just above the fixed die 1840 and showing newly formed coir pith tablets 2410 and excess coir having been ejected from the tablet press 1810 by the moveable door 1850 moving back under the fixed die 1840.

Figure 25:
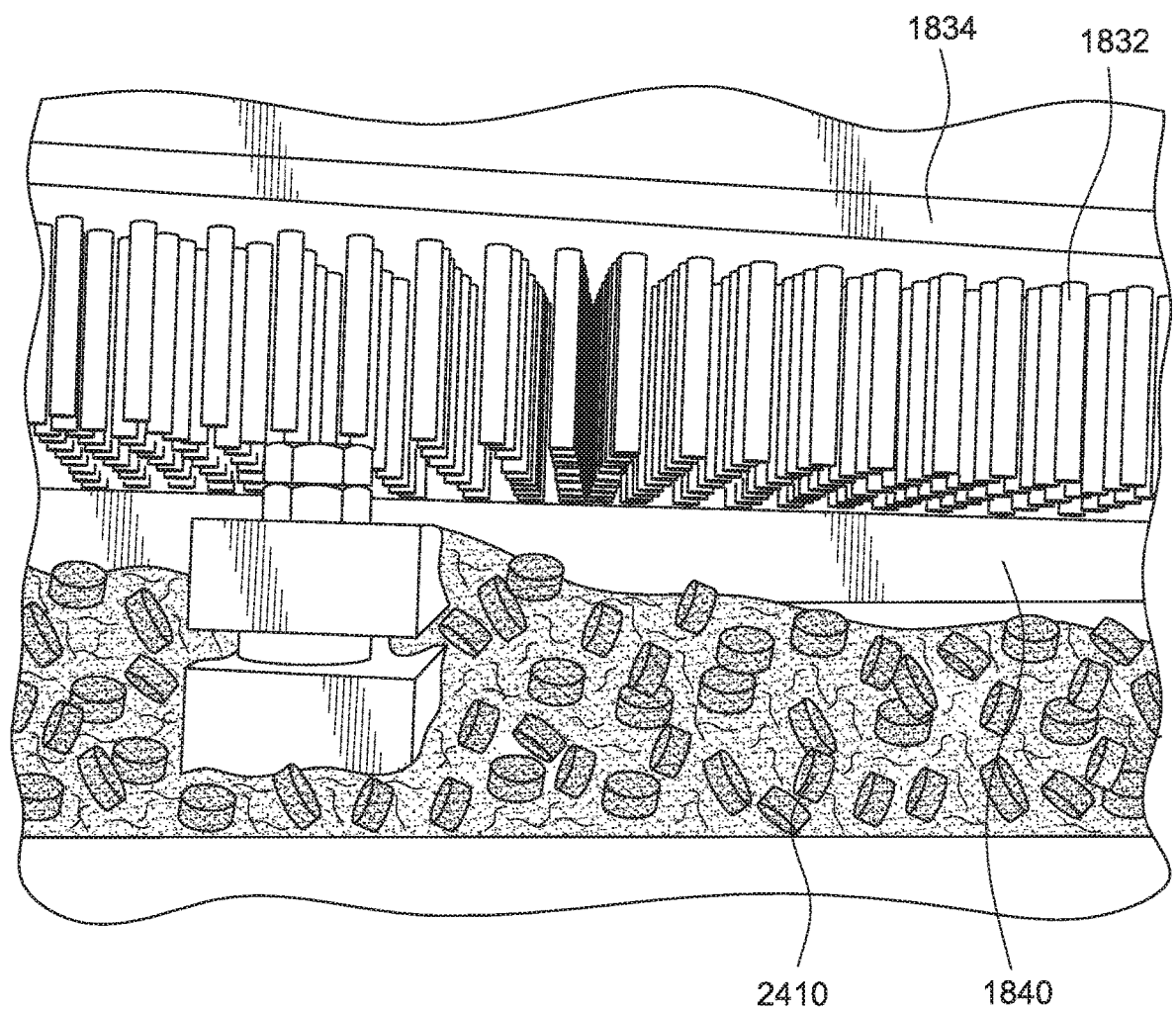
FIG. 25 depicts a close up, back view of the another apparatus for the production of coir pith tablets of FIG. 18 with a single hydraulic cylinder in a raised position showing the rows of pins for forming the coir pith tablets above the die and newly formed coir pith tablets and excess coir, in accordance with an exemplary embodiment of the disclosed subject matter.

FIG. 25 depicts a close up, back view of the another apparatus 1800 for the production of coir pith tablets of FIG. 18 with the single hydraulic cylinder 1820 in a raised position showing the rows of pins for forming the coir pith tablets above the die and the newly formed coir pith tablets 2410 and excess coir.

Figure 26:
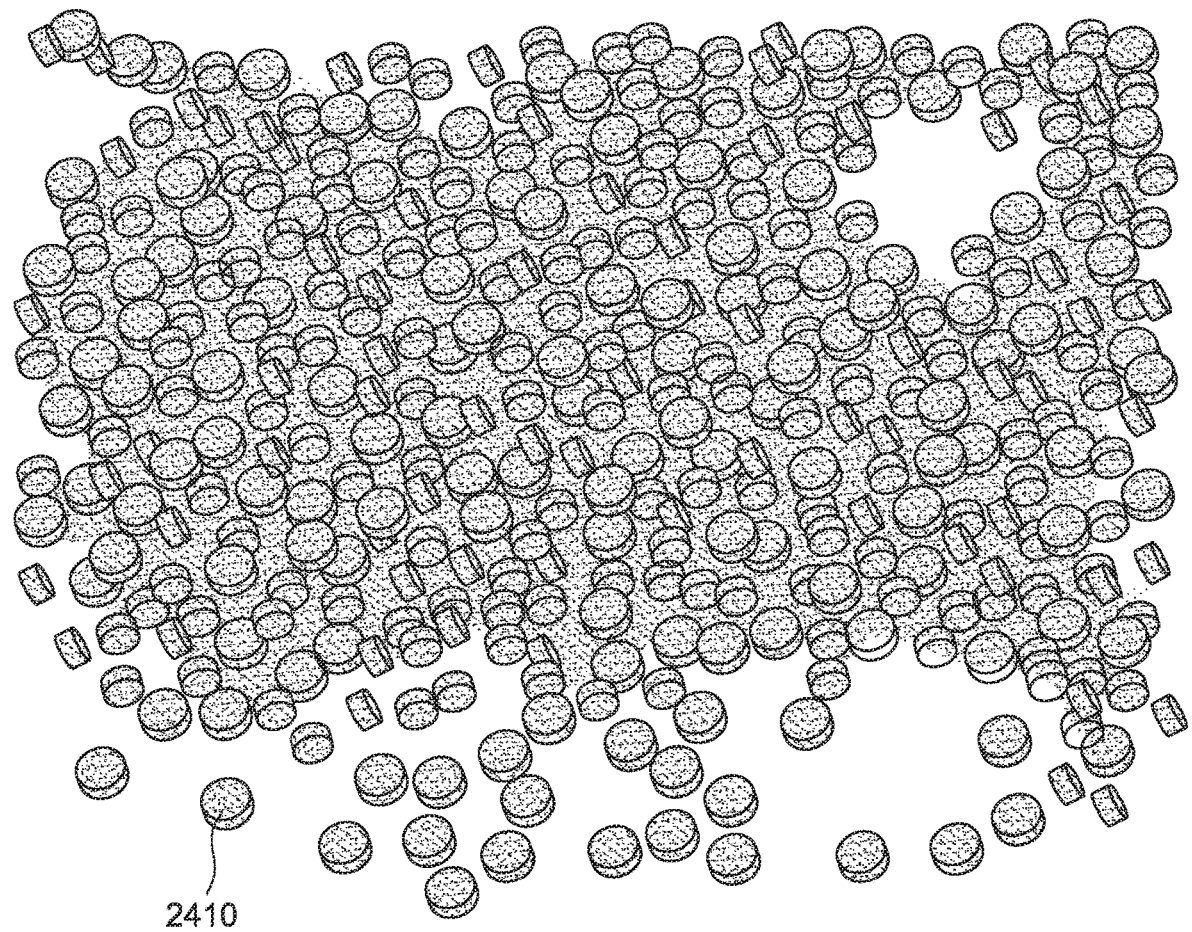
FIG. 26 depicts multiple coir pith tablets, in accordance with an exemplary embodiment of the disclosed subject matter.

FIG. 26 depicts multiple coir pith tablets 2410, in accordance with an exemplary embodiment of the disclosed subject matter.

Figure 27:
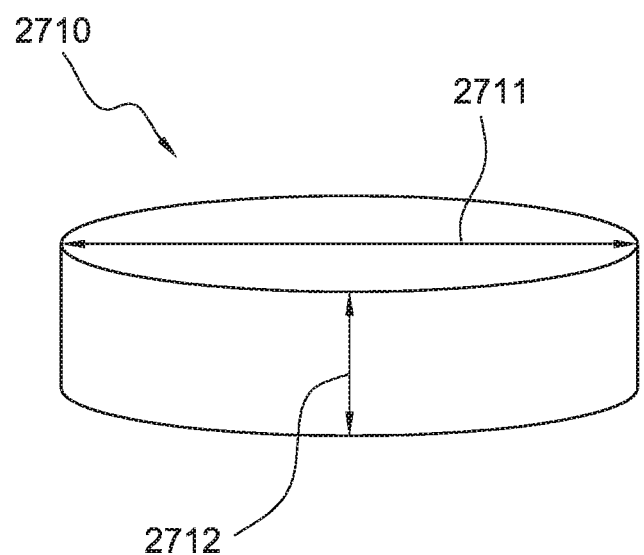
FIG. 27 depicts a top, perspective view of a single coir tablet, in accordance with an exemplary embodiment of the disclosed subject matter.

FIG. 27 depicts a top, perspective view of a single coir tablet 2710, in accordance with an exemplary embodiment of the disclosed subject matter. In FIG. 27, the tablet 2710 has a diameter 2711 of about 7.5 mm and a thickness 2712 of about 3 mm. The coir pith tablet 2410 is hydrophilic and should have a shelf life of more than 12 months.

An embodiment of the disclosed subject matter includes a tablet press including: a frame, the frame including a top plate with four openings formed therethrough adjacent to four corners of the top plate, a bottom plate with four openings formed therethrough adjacent to four corners of the bottom plate, four vertical guide rods with each vertical guide rod passing through opposite openings in the top plate and the bottom plate and being connected at opposite ends of each guide rod to the top plate and the tablet press; a hydraulic cylinder with a moveable internal piston connected to and through the top plate; a hydraulic pump system including a motor connected to a plurality of hydraulic lines, with at least one hydraulic line being operationally connected to the hydraulic cylinder; a moveable punch with a top portion, a punch main plate backer and a punch main plate with a plurality of pins extending from a bottom surface, where a distal end of the moveable internal piston is connected to the top portion of the moveable punch; a fixed die positioned above and attached to the bottom plate, with the fixed die including a plurality of openings formed therethrough with a top of each opening formed in a top surface of the fixed die and a bottom of each opening formed in a bottom surface of the fixed die; a moveable door being positioned outside of the frame and also beneath the fixed die and between the fixed die and the bottom plate to close the bottom of each opening in the fixed die and to push out any previously formed tablets and excess coir pith, the moveable door being connected to a moveable door piston and a moveable door hydraulic cylinder, which is operationally connected to the hydraulic pump system; a moving hopper connected to a moving hopper piston and a moving hopper hydraulic cylinder, which is operationally connected to the hydraulic pump system, the moving hopper being positioned outside of the frame and immediately above the top surface of the fixed die and being moveable into the frame and across the fixed die and back to a position outside of the frame; and a control unit operationally connected to the hydraulic pump system and motor to control operation and performance of the tablet press.

An embodiment of the disclosed subject matter includes a method of forming a compressed coir pith tablet, the method including: position a moveable door underneath a fixed die with multiple openings formed therethrough; move a moving hopper filled with coir pith over the fixed die to fill the openings in the fixed die; lower a press cylinder piston and insert pins into the filled openings in the fixed die and hold for a predetermined amount of time to compress the coir pith into tablets; retract the moveable door from underneath the fixed die; lower the press cylinder piston so the pins push the compressed coir pith tablets out of a bottom of the openings in the fixed die; raise the press cylinder piston to retract the pins out of the openings in the fixed die and raise the press cylinder piston away from the fixed die; refill the moving hopper with coir pith; determine whether to make more pellets, if, yes, then, return to the position a moveable door step and continue; and stop the method.

An embodiment of the disclosed subject matter includes a compressed absorbent tablet including a 7.5 mm diameter by 3 mm thick tablet of compressed coir pith with a moisture content of below 15%. The compressed absorbent tablet has a compression ratio of the compressed absorbent tablet is about 5 to 1. The compressed absorbent tablet, wherein the coir pith has particle sizes of between 2 mm to 4 mm. The compressed absorbent tablet, wherein the tablet includes at least 80% coir pith by volume. The compressed absorbent tablet can further include at least one of: a fertilizer; an insecticide; and a chemical/biological agent. The compressed absorbent tablet can further include at least one of: one or more odour eating enzymes; and one or more clumping agents.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A compressed absorbent tablet comprising:
   an approximately 7.5 mm diameter by 3 mm thick tablet of a pre-dried coir pith with particle sizes between 2 mm to 4 mm and a pre-compression moisture content of below 15% and no added moisture, and the compressed absorbent tablet having a 5:1 to 9:1 compression ratio.

2. The compressed absorbent tablet of claim 1, wherein the coir pith has coir fibers removed.

3. A method of making the compressed absorbent tablet of claim 1 comprising:

drying a volume of uncompressed coir pith with a 2 mm to 4 mm length to a moisture content of below 15%; and compressing a portion of the volume of uncompressed coir pith with the moisture content of below 15% and particle sizes between 2 mm to 4 mm length into a tablet having an approximately 7.5 mm diameter by 3 mm thickness and a 5:1 to 9:1 compression ratio;

wherein no moisture is added to the uncompressed coir pith either before or after being dried to have the moisture content of below 15% and the tablet is not dried after being compressed.

4. The method of claim 3 further comprising:
removing coir fibers from the uncompressed coir pith before compressing the tablet.

5. The method of claim 4 further comprising:
simultaneously compressing a plurality of tablets in a fixed die with a plurality of holes formed there through.

6. The method of claim 5 wherein the simultaneously compressing the plurality of tablets in the fixed die with the plurality of holes formed there through further comprises:
simultaneously compressing the plurality of tablets in the fixed die with the plurality of holes formed there through using a moveable punch with a plurality of pins each reciprocally-shaped and spaced on the moveable punch to enter the plurality of holes in the fixed die.

7. The method of claim 3 further comprises:
compressing each tablet with an approximately 110 ton load.

8. The method of claim 7 further comprises:
compressing each tablet with the approximately 110 ton load for approximately 15 seconds.

9. A compressed absorbent tablet comprising:
an approximately 3 mm thick tablet of a pre-dried coir pith with particle sizes between 2 mm to 4 mm and a pre-compression moisture content of below 15% and no added moisture, and the compressed absorbent tablet having a 5:1 to 9:1 compression ratio.

10. The compressed absorbent tablet of claim 9, wherein the coir pith has coir fibers removed.

11. A method of making the compressed absorbent tablet of claim 9 comprising:
drying a volume of uncompressed coir pith with a 2 mm to 4 mm length to a moisture content of below 15%; and compressing a portion of the volume of uncompressed coir pith with the moisture content of below 15% and particle sizes between 2 mm to 4 mm length into a tablet having an approximately 7.5 mm diameter by 3 mm thickness and a 5:1 to 9:1 compression ratio;

wherein no moisture is added to the uncompressed coir pith either before or after being dried to have the moisture content of below 15% and the tablet is not dried after being compressed.

12. The method of claim 11 further comprising:
removing coir fibers from the uncompressed coir pith before compressing the tablet.

13. The method of claim 12 further comprising:
simultaneously compressing a plurality of tablets in a fixed die with a plurality of holes formed there through.

14. The method of claim 13 wherein the simultaneously compressing the plurality of tablets in the fixed die with the plurality of holes formed there through further comprises:
simultaneously compressing the plurality of tablets in the fixed die with the plurality of holes formed there through using a moveable punch with a plurality of pins each reciprocally-shaped and spaced on the moveable punch to enter the plurality of holes in the fixed die.

15. The method of claim 11 further comprises:
compressing each tablet with an approximately 110 ton load.

16. The method of claim 15 further comprises:
compressing each tablet with the approximately 110 ton load for approximately 15 seconds.

* * * * *